US011803380B2

(12) United States Patent
Giroux et al.

(10) Patent No.: US 11,803,380 B2
(45) Date of Patent: Oct. 31, 2023

(54) HIGH PERFORMANCE SYNCHRONIZATION MECHANISMS FOR COORDINATING OPERATIONS ON A COMPUTER SYSTEM

(71) Applicant: NVIDIA Corporation, Santa Clara, CA (US)

(72) Inventors: Olivier Giroux, Santa Clara, CA (US); Jack Choquette, Palo Alto, CA (US); Ronny Krashinsky, San Francisco, CA (US); Steve Heinrich, Madison, AL (US); Xiaogang Qiu, San Jose, CA (US); Shirish Gadre, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 335 days.

(21) Appl. No.: 16/712,236

(22) Filed: Dec. 12, 2019

(65) Prior Publication Data

US 2021/0124627 A1    Apr. 29, 2021

Related U.S. Application Data

(60) Provisional application No. 62/927,511, filed on Oct. 29, 2019, provisional application No. 62/927,417, filed on Oct. 29, 2019.

(51) Int. Cl.
*G06F 7/08*      (2006.01)
*G06F 9/30*      (2018.01)
(Continued)

(52) U.S. Cl.
CPC ........ *G06F 9/30043* (2013.01); *G06F 9/3009* (2013.01); *G06F 9/321* (2013.01);
(Continued)

(58) Field of Classification Search
CPC .... G06F 9/30043; G06F 9/3009; G06F 9/321; G06F 9/3871; G06F 9/522; G06F 9/542;
(Continued)

(56) References Cited

U.S. PATENT DOCUMENTS 7,634,621 B1    12/2009  Coon et al.
7,680,988 B1     3/2010  Nickolls et al.
(Continued)

OTHER PUBLICATIONS

Nikos Anastopoulos et al . "Facilitating Efficient Synchronization of Asymmetric Threads on Hyper-Threaded Processors". (Year: 2008).*
(Continued)

*Primary Examiner* — Kevin L Young
*Assistant Examiner* — Abdou K Seye
(74) *Attorney, Agent, or Firm* — Nixon & Vanderhye, P.C.

(57) ABSTRACT

To synchronize operations of a computing system, a new type of synchronization barrier is disclosed. In one embodiment, the disclosed synchronization barrier provides for certain synchronization mechanisms such as, for example, "Arrive" and "Wait" to be split to allow for greater flexibility and efficiency in coordinating synchronization. In another embodiment, the disclosed synchronization barrier allows for hardware components such as, for example, dedicated copy or direct-memory-access (DMA) engines to be synchronized with software-based threads.

22 Claims, 21 Drawing Sheets

(51) Int. Cl.
*G06F 12/0808* (2016.01)
*G06F 12/0888* (2016.01)
*G06F 9/32* (2018.01)
*G06F 9/38* (2018.01)
*G06F 9/52* (2006.01)
*G06F 9/54* (2006.01)

(52) U.S. Cl.
CPC .......... *G06F 9/3838* (2013.01); *G06F 9/3871* (2013.01); *G06F 9/522* (2013.01); *G06F 9/542* (2013.01); *G06F 9/544* (2013.01); *G06F 9/546* (2013.01); *G06F 12/0808* (2013.01); *G06F 12/0888* (2013.01); *G06F 9/3004* (2013.01); *G06F 2212/621* (2013.01)

(58) Field of Classification Search
CPC ...... G06F 9/544; G06F 9/546; G06F 12/0808; G06F 12/0888; G06F 2212/621; G06F 9/3004
See application file for complete search history.

(56) References Cited

U.S. PATENT DOCUMENTS

| | | | |
|---|---|---|---|
| 7,689,989 | B2 | 3/2010 | Dostert |
| 7,941,585 | B2 | 5/2011 | Asher et al. |
| 8,108,625 | B1 | 1/2012 | Coon et al. |
| 8,381,203 | B1 | 2/2013 | Beylin et al. |
| 8,555,035 | B1 | 10/2013 | Patney et al. |
| 9,069,664 | B2 | 1/2015 | Dally |
| 9,117,284 | B2 | 8/2015 | Nienhaus et al. |
| 9,158,595 | B2 | 10/2015 | Lindholm et al. |
| 9,442,755 | B2 | 9/2016 | Lindholm et al. |
| 9,448,803 | B2 | 9/2016 | Lindholm et al. |
| 10,002,031 | B2 | 6/2018 | Llamas et al. |
| 10,013,290 | B2 | 7/2018 | Jones |
| 10,217,183 | B2 | 2/2019 | Palmer et al. |
| 10,318,435 | B2 | 6/2019 | Guthrie |
| 10,585,667 | B2 | 3/2020 | Grochowski |
| 2004/0015622 | A1 | 1/2004 | Avery |
| 2006/0026309 | A1 | 2/2006 | Day |
| 2006/0048147 | A1* | 3/2006 | Silvera ............... G06F 9/52 718/100 |
| 2007/0073921 | A1 | 3/2007 | Vemula |
| 2010/0250809 | A1* | 9/2010 | Ramesh ............. G06F 9/526 710/200 |
| 2011/0035561 | A1* | 2/2011 | Zeffer ............... G06F 9/3834 711/E12.002 |
| 2011/0219208 | A1* | 9/2011 | Asaad ................ G06F 9/06 712/12 |
| 2013/0117750 | A1* | 5/2013 | Howes ............... G06F 9/524 718/102 |
| 2014/0026138 | A1* | 1/2014 | Itou .................. G06F 9/522 718/102 |
| 2014/0310484 | A1 | 10/2014 | Giroux |
| 2015/0020558 | A1 | 1/2015 | Williams |
| 2017/0052976 | A1 | 2/2017 | Verma |
| 2017/0161100 | A1* | 6/2017 | Rashid ............... G06F 13/12 |
| 2017/0177501 | A1 | 6/2017 | Guthrie |
| 2017/0293565 | A1 | 10/2017 | Priyadarshi |
| 2018/0322077 | A1 | 11/2018 | Qiu et al. |
| 2018/0322078 | A1 | 11/2018 | Qiu et al. |
| 2018/0365056 | A1* | 12/2018 | Mower ............... G06F 9/4881 |
| 2019/0042337 | A1* | 2/2019 | Dinan ................ G06F 9/546 |
| 2019/0065401 | A1 | 2/2019 | Dormitzer |

OTHER PUBLICATIONS

Cuda C Programming Guide, PG-02829-001_v10.2 | Nov. 2019 https://docs.nvidia.com/cuda/cuda-c-programming-guide/index.html.

Cutlass: Fast Linear Algebra in Cuda C++, Dec. 5, 2017 (Updated May 21, 2018), https://devblogs.nvidia.com/cutlass-linear-algebra-cuda/.

Xiao et al., "Inter-Block GPU Communication via Fast Barrier Synchronization," 2010 IEEE International Symposium on Parallel & Distributed Processing (IPDPS) (Apr. 19-23, 2010).

C. Li, Y. Yang, H. Dai, S. Yan, F. Mueller and H. Zhou, "Understanding the tradeoffs between software-managed vs. hardware-managed caches in GPUs," 2014 IEEE International Symposium on Performance Analysis of Systems and Software (ISPASS), Monterey, CA, 2014, pp. 231-242.

Using CUDA Warp-Level Primitives, By Yuan Lin and Vinod Grover, Jan. 15, 2018 https://deyblogs.nvidia.com/using-coda-warp-level-primitives/.

Fujii, Yusuke & Azumi, Takuya & Nishio, Nobuhiko & Kato, Shinpei & Edahiro, Masato. (2013). Data Transfer Matters for GPU Computing. Proceedings of the International Conference on Parallel and Distributed Systems—ICPADS. 275-282.

M. Gebhart, S. W. Keckler, B. Khailany, R. Krashinsky and W. J. Daily, "Unifying Primary Cache, Scratch, and Register File Memories in a Throughput Processor," 2012 45th Annual IEEE/ACM International Symposium on Microarchitecture, Vancouver, BC, 2012, pp. 96-106.

A. Nery, N. Nedjah and F. Franca. "Two Alternative Parallel Implementations for Ray Tracing: OPENMP and MPI", Mecanica Computacional, Buenos Aires, Argentina, Nov. 15-18, 2010, vol. XXIX, pp. 6295-6302.

* cited by examiner

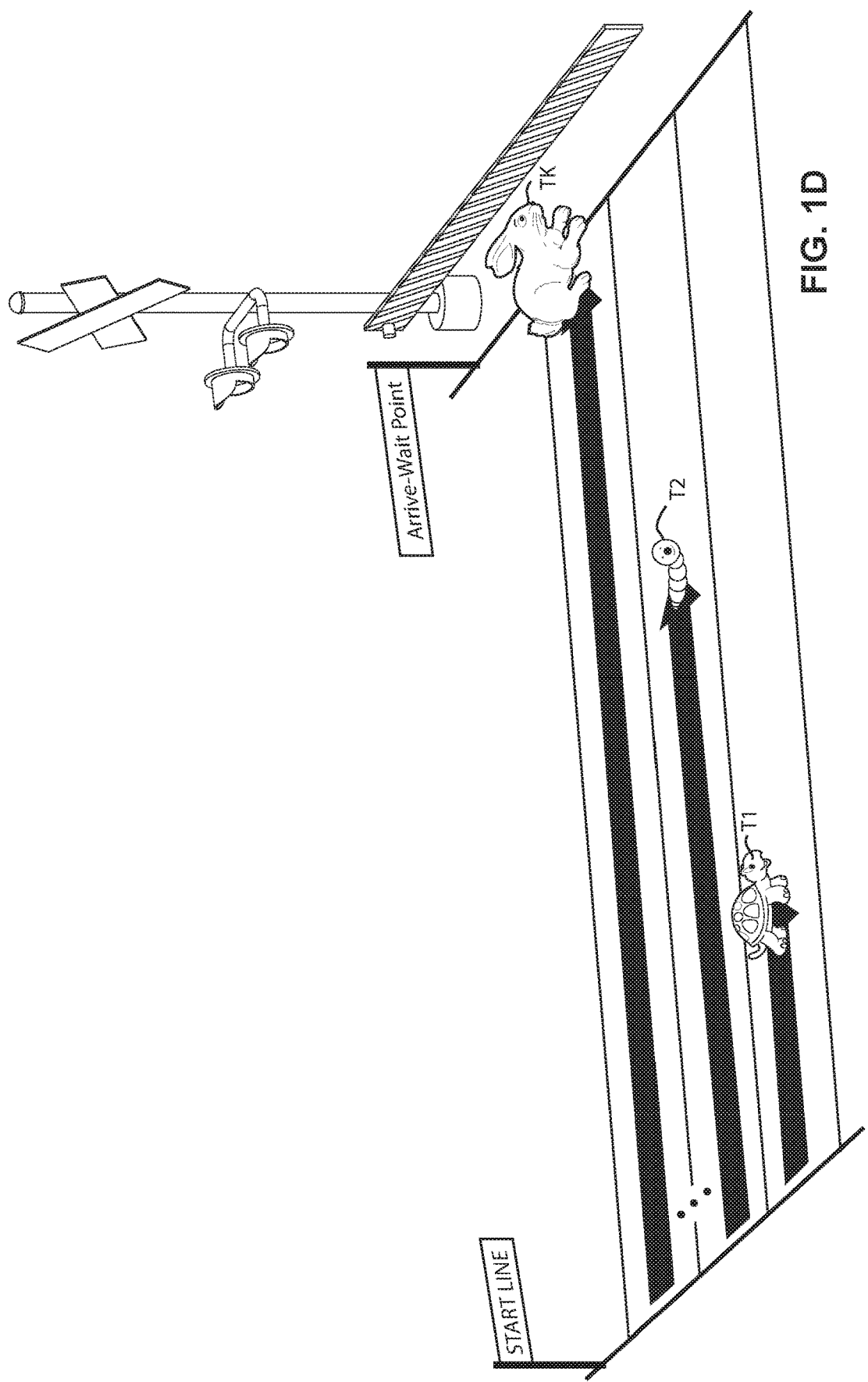

HIGH PERFORMANCE SYNCHRONIZATION MECHANISMS FOR COORDINATING OPERATIONS ON A COMPUTER SYSTEM

CROSS-REFERENCES TO RELATED APPLICATIONS

This application claims benefit of Provisional Application No. 62/927,417 filed Oct. 29, 2019 and Provisional Application No. 62/927,511 filed Oct. 29, 2019, each of which is incorporated herein by reference. This application is related to commonly-assigned copending US patent application No. 16/712,083, filed Dec. 12, 2019, incorporated herein by reference.

STATEMENT REGARDING FEDERALLY SPONSORED RESEARCH OR DEVELOPMENT

None.

BACKGROUND & SUMMARY

Massively-parallel high performance multithreaded multicore processing systems—systems that contain many processing cores operating in parallel—process data much more quickly than was possible in the past. These processing systems break down complex computations into smaller tasks which are concurrently performed by parallel processing cores. This "divide and conquer" approach allows complex computations to be performed in a small fraction of the time than what would be required when only one or a few processors work on the same computations in order. But such parallel processing also creates the need for communication and coordination between parallel execution threads or blocks.

One way for different execution processes to coordinate their states with one another is by using barrier synchronization. Barrier synchronization typically involves each process in a collection of parallel-executing processes waiting at a barrier until all other processes in the collection catch up. No process can proceed beyond the barrier until all processes reach the barrier.

FIGS. 1A-1H together are a flip chart animation that illustrates an example of such barrier synchronization. FIG. 1A shows threads or other execution processes T1, T2, . . . TK. Three threads are shown, but there could be hundreds or thousands of threads. The threads begin at a common point (e.g., an initialization point, a previous barrier, etc.—designated here for purposes of illustration as "start line").

One thread TK is a "hare"—it executes faster than other threads and proceeds more quickly towards a barrier (indicated here graphically by a railroad crossing gate and the designation "arrive-wait point" the significance of which will be explained below).

Another thread T1 is a "tortoise"—it executes more slowly than other threads and proceeds more slowly toward the barrier.

FIGS. 1B, 1C, 1D show the various threads proceeding at different paces towards the barrier. FIG. 1D shows "hare" thread TK arriving at the barrier before the "tortoise" thread T1. Because "hare" thread TK cannot proceed beyond the barrier until "tortoise" thread T1 also arrives at the barrier, the "hare" thread would wait (in the prior art—but see below for "split" arrive-wait functionality) at the barrier. This could potentially involve many cycles of delay—for example, if the "tortoise" thread T1 is slow because its waiting for service from main memory, "hare" thread TK may have to wait a long time (FIG. 1E) before the "tortoise" thread finally catches up and reaches the barrier.

As soon as the last straggler "tortoise" thread T1 reaches the barrier (FIG. 1F), the barrier unblocks (illustrated in FIG. 1G by the railroad crossing gate opening) and all threads can proceed beyond the barrier.

An example of a useful application that will benefit from synchronization barriers is "asynchronous compute." With asynchronous compute, GPU utilization is increased by scheduling tasks out of order rather than in strict sequence so that "later" (in the sequence) computations can be performed at the same time as "earlier" (in the sequence) computations. As one example, when rendering graphics, instead of running a shader sequentially with other workloads, asynchronous compute may allow execution of the shader simultaneously with other work. While the GPU API may be designed to assume that most or all calls are independent, the developer is also provided with control over how tasks are scheduled and to implement barriers to ensure correctness such as when one operation depends on the result of another. See for example U.S. Pat. Nos. 9,117,284 and 10,217,183.

Hardware-based synchronization mechanisms have been included in GPUs to support such kinds of synchronization barrier functions. See e.g., Xiao et al, "Inter-Block GPU Communication via Fast Barrier Synchronization," 2010 IEEE International Symposium on Parallel & Distributed Processing (IPDPS) (19-23 Apr. 2010). Compute-capable GPUs with such hardware-based synchronization capabilities have usually been programmed in the bulk-synchronous style—wide parallel tasks with barrier synchronization within, and fork/join between. See for example US Patent Publication No. 2015020558.

In modern GPU architectures, many execution threads execute concurrently, and many warps each comprising many threads also execute concurrently. When threads in a warp need to perform more complicated communications or collective operations, the developer can use for example NVIDIA's CUDA "_syncwarp" primitive to synchronize threads. The _syncwarp primitive initializes hardware mechanisms that cause an executing thread to wait before resuming execution until all threads specified in a mask have called the primitive with the same mask. For more details see for example U.S. Pat. Nos. 8,381,203; 9,158,595; 9,442,755; 9,448,803; 10,002,031; and 10,013,290; and see also devblogs.nvidia.com/using-cuda-warp-level-primitives/; and docs.nvidia.com/cuda/cuda-c-programming-guide/index.html#memory-fence-functions.

While hardware-implemented barriers have proven to be useful, it is sometimes helpful for a program to use more than one barrier at the same time. For example, a program can potentially use a first synchronization barrier to block a first group of threads and a second, different synchronization barrier to block an additional group of threads (or sometimes the same synchronization barrier is reused to block the same group of threads again and again as they progress down their execution paths). In the past, to perform multiple barrier operations, a software developer typically would need to indicate to the compiler in advance how many barriers were needed. In systems in which synchronization barriers were hardware-implemented, there were a limited number of synchronization barriers available. Some programs needed or could have used more synchronization barriers than were supported in hardware by the hardware platform.

Because of additional uses and demand for synchronization barriers, there is a need to improve the allocation of synchronization barriers. In particular, certain past hardware-accelerated barrier implementations and approaches had major shortcomings:

1. Programs that required more than one physical hardware barrier had difficulty allocating them.

2. Barriers with the classical "arrive-and-wait" interface don't hide synchronization latency well (referring to the FIG. 1A-1H flipchart animation, the "rabbit" thread may have to wait awhile and do nothing until the "tortoise" threads catch up).

3. Copy engines (such as direct memory access (DMA) units) usually can't participate directly in hardware-based synchronization as they are not software threads.

It has long been possible to implement synchronization barriers in software but software-implemented barriers have not necessarily provided the same levels of performance as hardware-implemented barriers. For example, some developers in the past used hardware to implement as many barriers as were supported by the platform hardware, and if more (or different kinds of) barriers were needed, implemented additional barriers in software. Developers who implemented synchronization barriers in software often suffered loss of performance. In particular, over allocating barriers could mean fewer paths of execution and correspondingly decreased performance. It was not always an easy trade-off for developers to determine whether performance would be improved by using more barriers and fewer tasks.

There is a need to improve the allocation of hardware-accelerated and/or supported synchronization barriers in a way that provides flexibilities of software allocation but which does not adversely impact performance.

BRIEF DESCRIPTION OF THE DRAWINGS

FIGS. 1A-1H together provide a time sequence of images comprising a flip chart animation that illustrates use of a synchronization barrier (to view the animation, start on FIG. 1A of an electronic copy of this patent and repeatedly press the "page down" key);

DETAILED DESCRIPTION OF EXAMPLE NON-LIMITING EMBODIMENTS

Figure 1A:
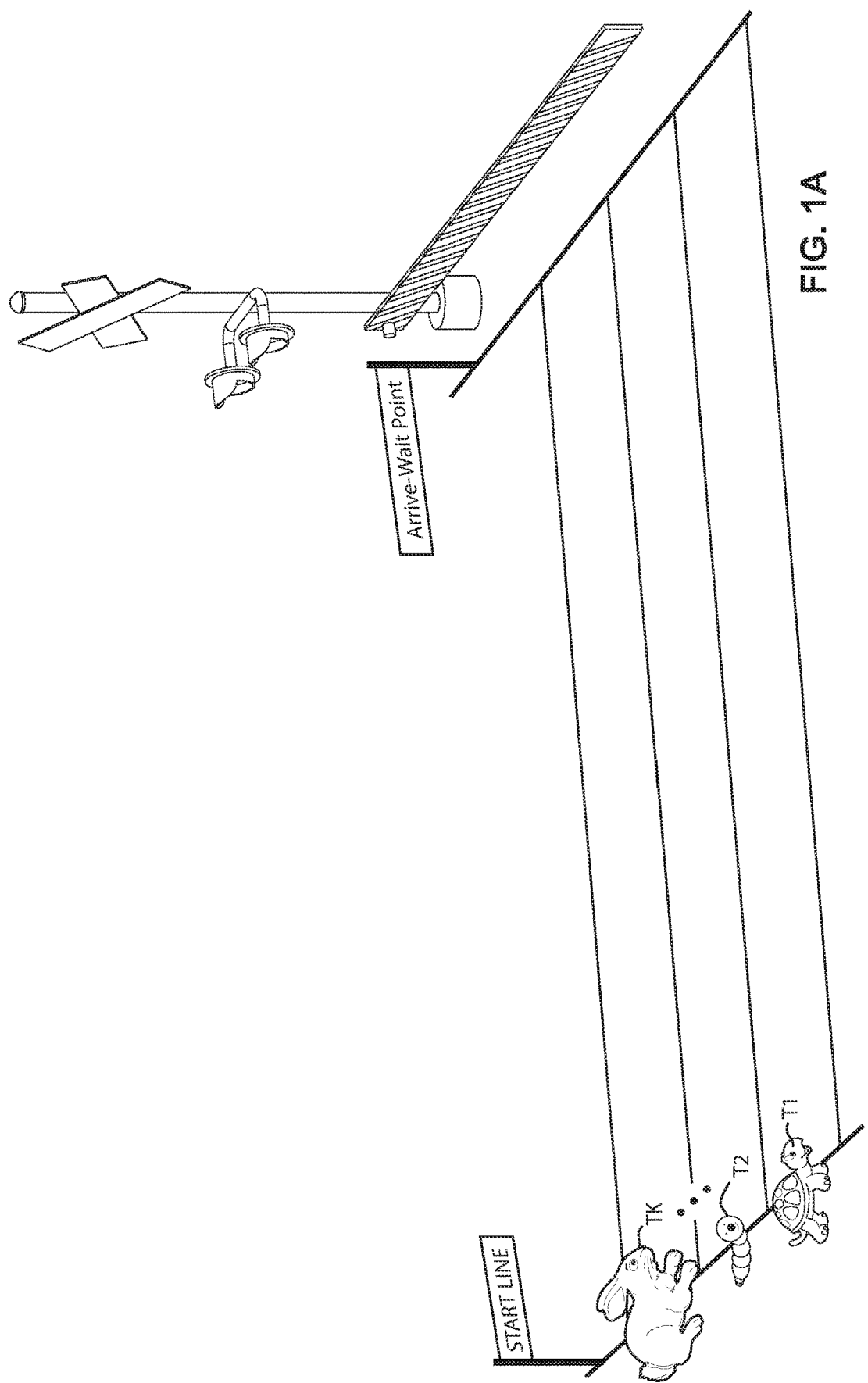
Figure 1B:
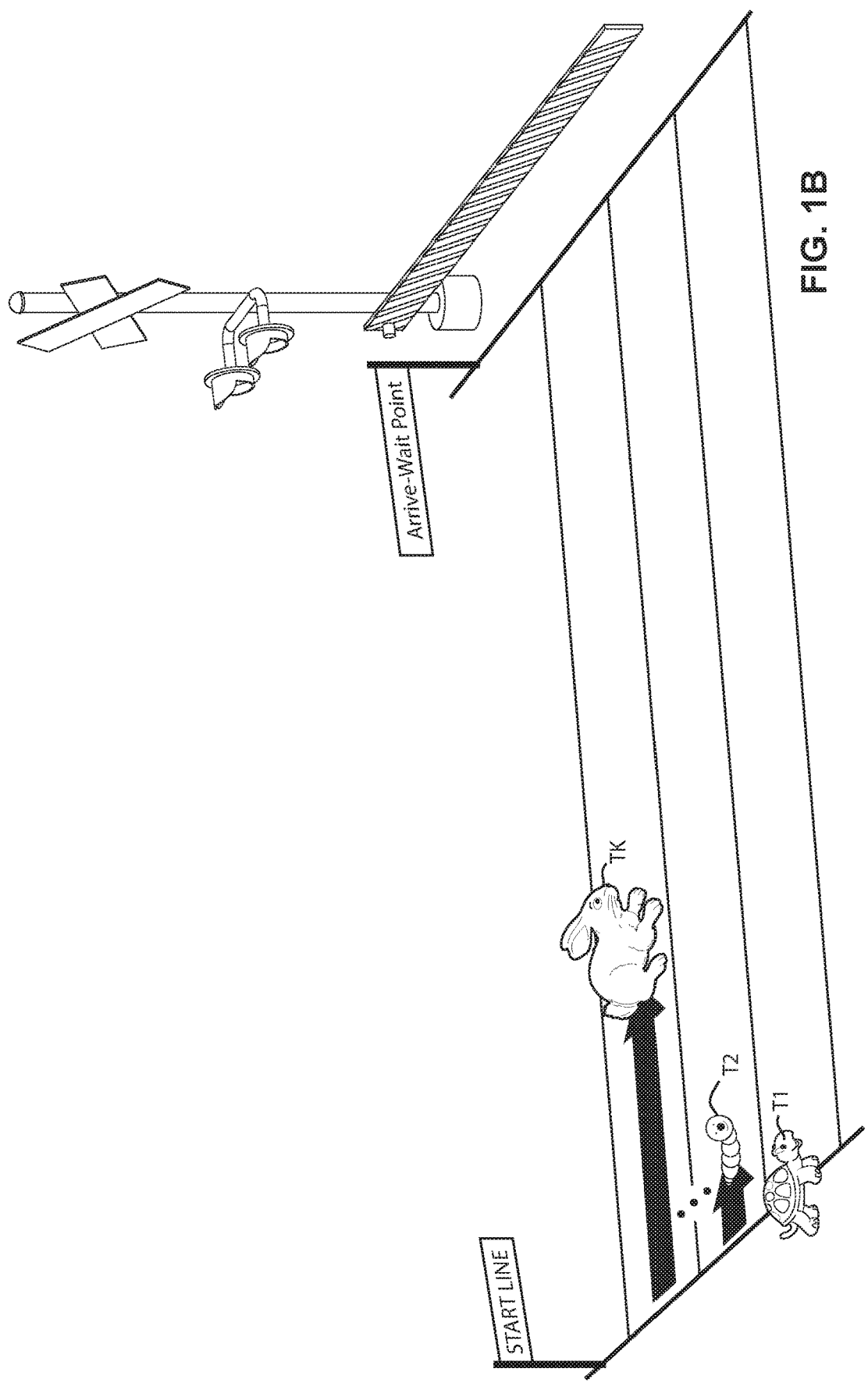
Figure 1C:
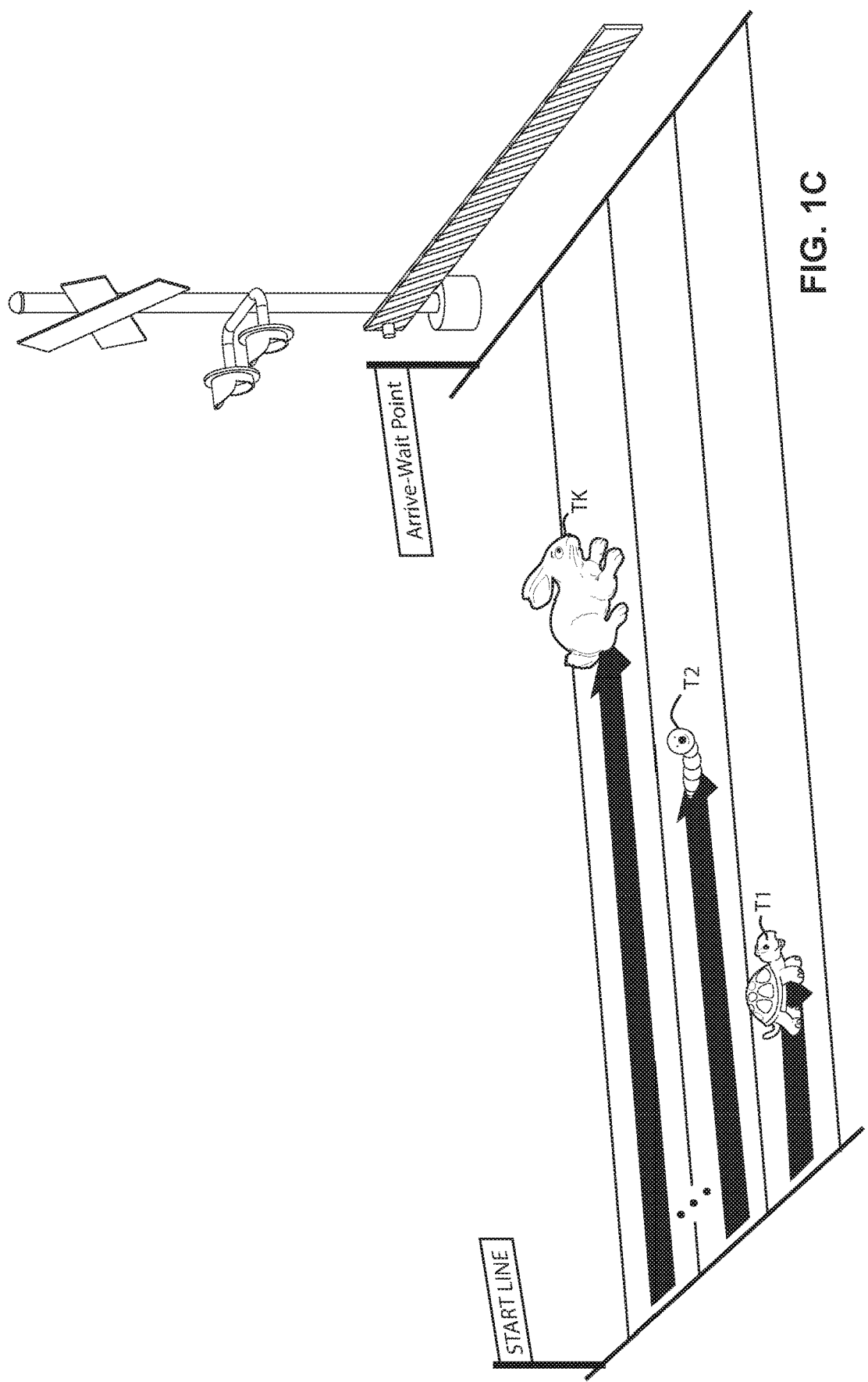
Figure 1E:
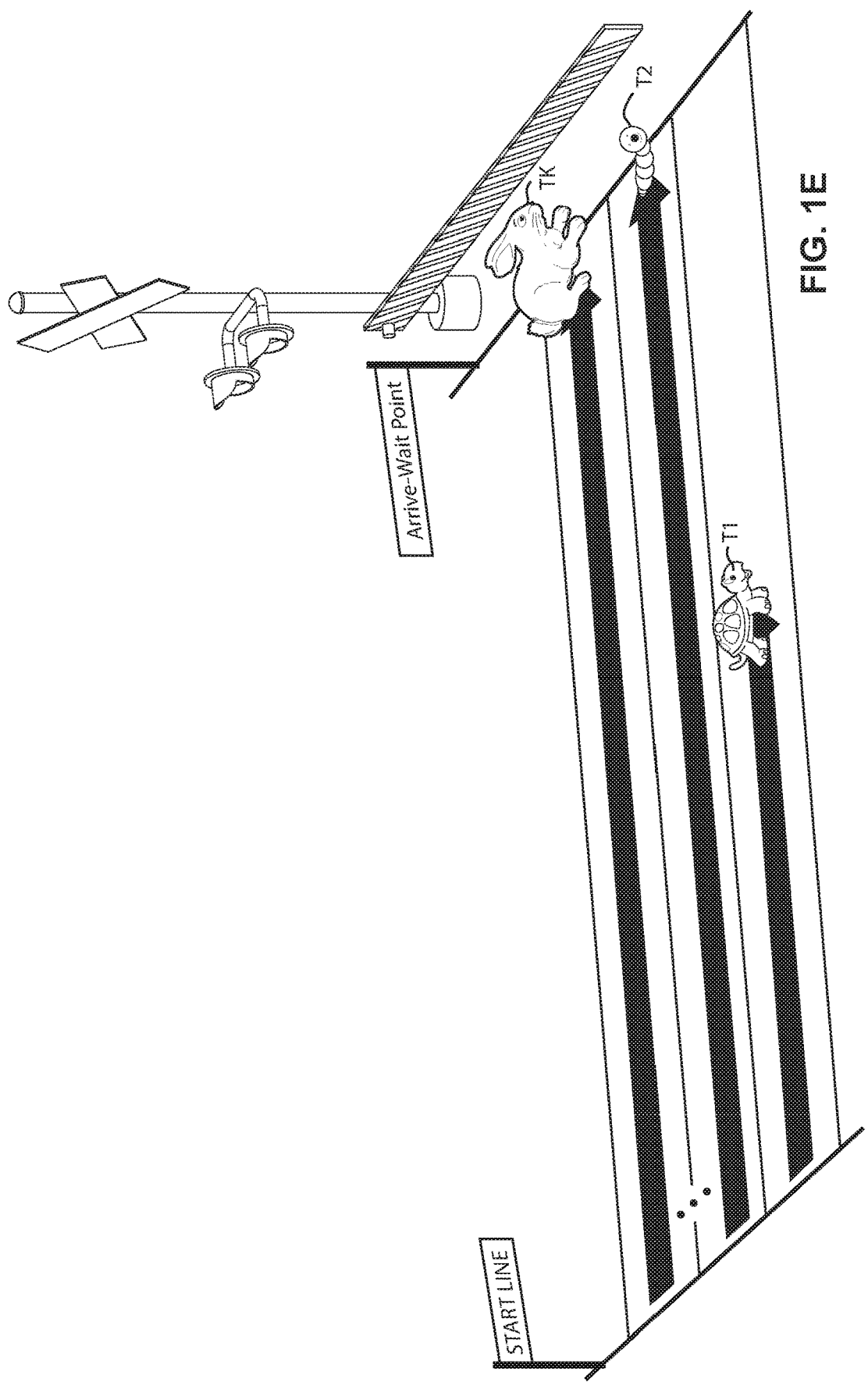
Figure 1F:
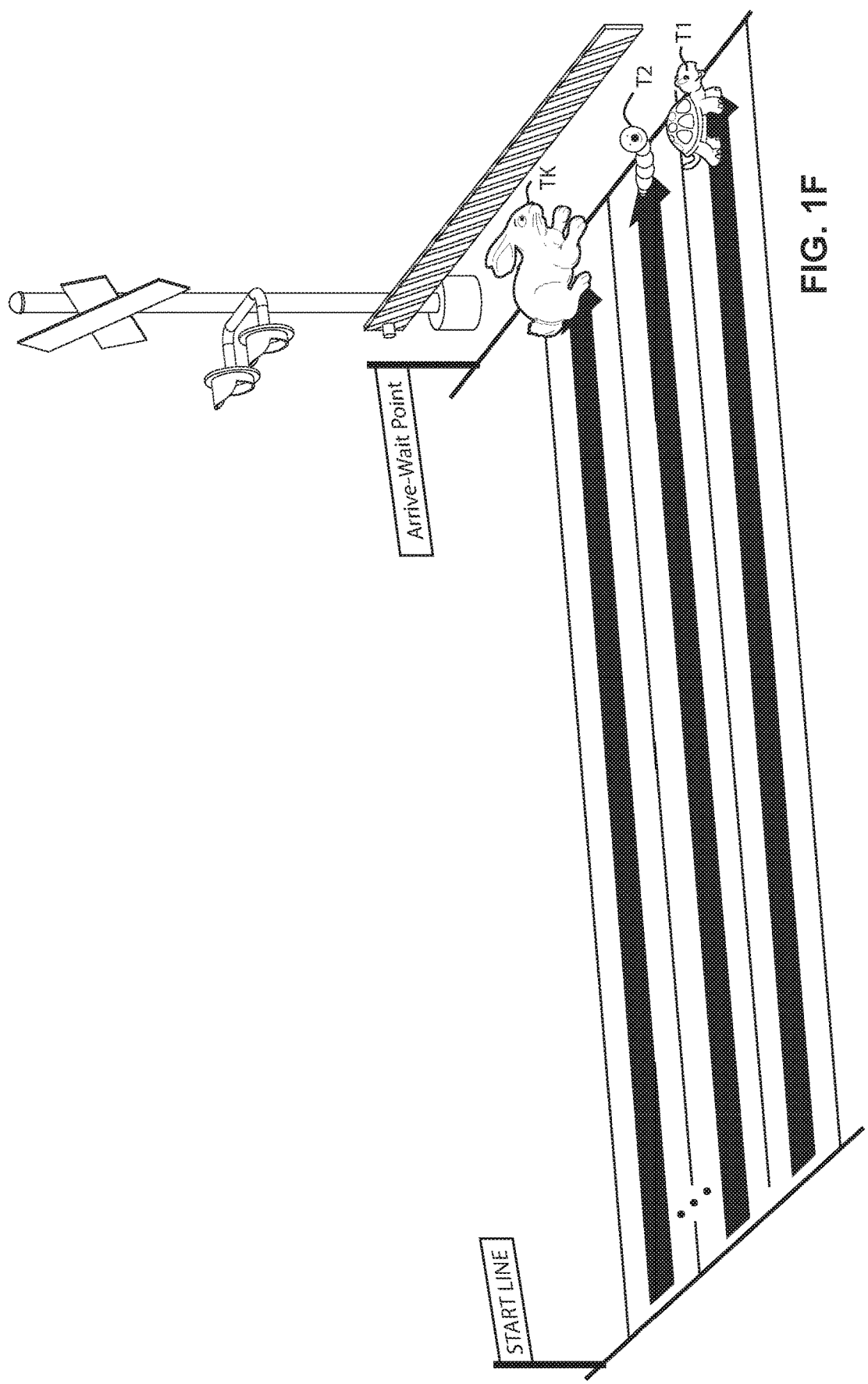
Figure 1G:
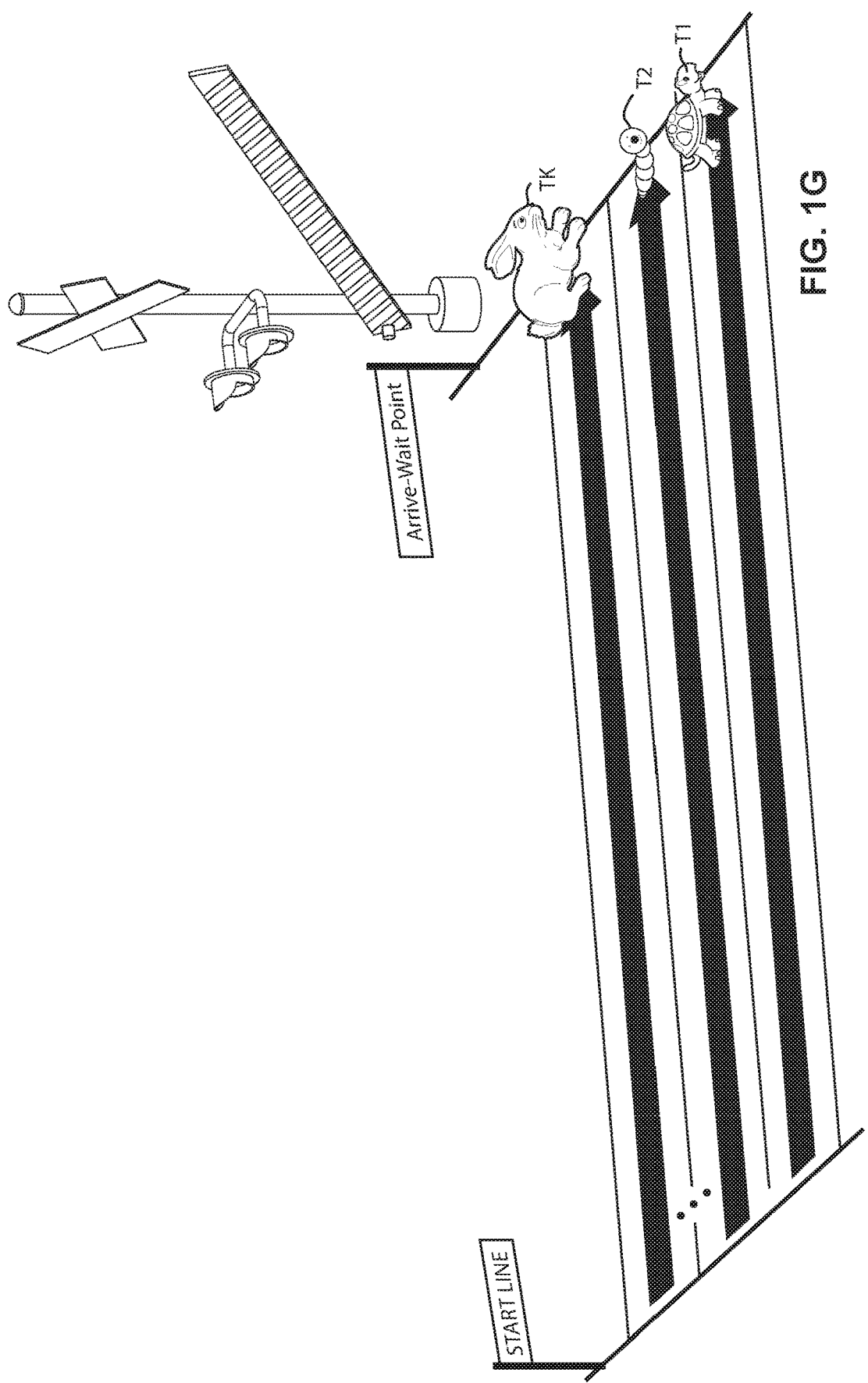
Figure 1H:
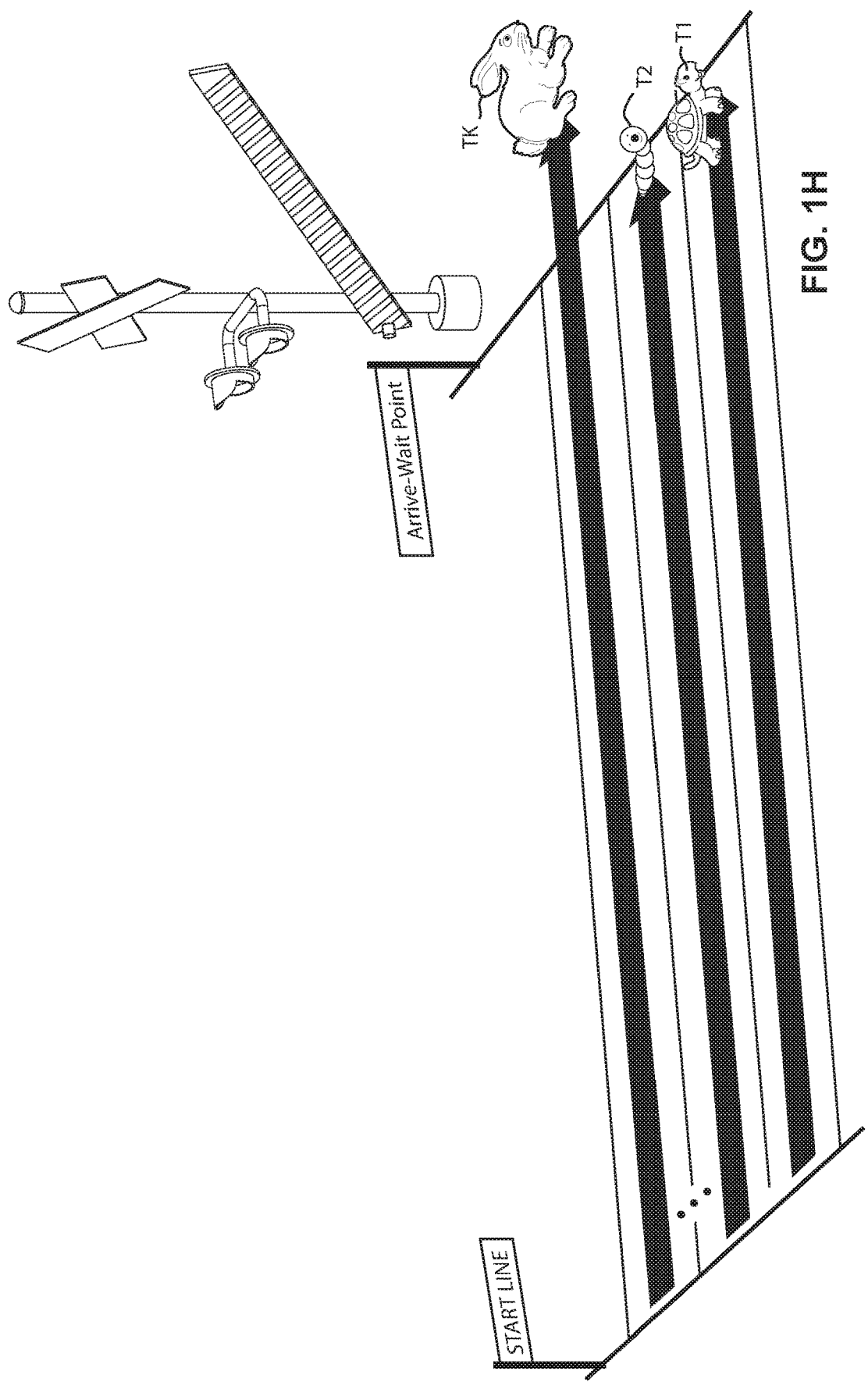

We introduce a new type of barrier that solves the problems described above:

1. It is implemented in memory, and therefore allocates as memory does.

2. The "arrive" and the "wait" operations are split, to let unrelated tasks execute in-between.

3. Asynchronous copy hardware from the same streaming multiprocessor (SM) is able to participate as a virtual or "moral" thread.

Implementing barriers in memory is entirely feasible, and is commonly done by software. Software split barriers are less common but also exist in the field. We provide hardware-acceleration for these idiom(s), and we integrate hardware copy units with the hardware acceleration as though the hardware copy units are "morally" threads.

We significantly improve the programming effort needed to create a barrier with rich functionality and good performance. We also make it possible to introduce more asynchronous copy operations to the streaming multiprocessors (SMs) of a GPU, by providing an innovative way to synchronize with the copy operations, which improves SM performance by offloading work from the core threads.

The present example non-limiting technology thus elevates additional functionality into barriers, which in turn may increase the prevalence of synchronization barriers. In particular, much more code than in the past will potentially need (and be able) to use multiple synchronization barriers.

Split Arrive-Wait Barrier Synchronization Feature

As discussed above, barrier synchronization is often or typically defined as a construct in which some set of threads or other processes are blocked at the synchronization point and when all threads or other processes in a specified set arrive at the synchronization point, all threads or other processes are then unblocked. See FIGS. 1A-1H.

In particular, in many prior synchronization barrier implementations, threads such as the "hare" thread of FIG. 1A et seq. that arrive early at the synchronization point simply waited and did no useful work until they became unblocked by the arrival of later-completing threads. A typical scenario was that as more and more threads arrived at the synchronization point, soon there was only one straggler thread outstanding that all of the other threads were waiting on before they could all become unblocked and move to the next processing phase.

Suppose a programmer were to implement a barrier in software. Assume that the programmer/developer wrote code to implement the barrier. An economical operation would be "arrive and wait." This is what an "Open MP" barrier implements and how prior CUDA barriers are implemented. An example implementation would involve every thread arriving at the synchronization point asserting "I have arrived." The program would then count the number of threads that have arrived. If not all threads have arrived, the program would block. Such a system would simply wait and spin, polling the count until the count arrives at the correct value indicating that all threads have arrived. The polling loop is wasteful, since the threads are not doing any useful work while they are waiting, the processor is spending a lot of time polling the count, and the system is thus consuming resources that could otherwise be used to do useful work.

Some recent software-based approaches have decoupled the two events of arriving at the synchronization point and blocking at the synchronization point. Example non-limiting embodiments herein similarly provide a decoupling as to how a thread or other process arrives and waits at a synchronization point. In example non-limiting implementations, such technology is used so that threads first arrive at the synchronization point where their arrival is accounted for. However, in example non-limiting implementations, the threads need not block when they arrive at the synchronization point. Rather, they can do other work unrelated to the synchronization point (i.e., work that does not need to be synchronized by this particular synchronization barrier, but rather is asynchronous with respect to this particular synchronization barrier). Once they complete doing this other work and need to return to work that requires synchronization by the barrier, they may then block if needed. However, if the other work is significant enough, by the time the thread completes the other work, all other threads will already have arrived at the synchronization point and no blocking occurs at all. In such situations, example non-limiting implementations simply note that all of the threads have arrived at the synchronization point and atomically block and unblock without actually delaying or stopping any thread from continuing its processing (except for threads that run out of other work that they could be doing while waiting for unblocking at the synchronization point).

Example non-limiting embodiments thus break the "arrive and wait" function into two different atomic functions: (1) arrive, and (2) wait. The "arrive" part of the function is all the accounting and other management that typically needs to be done before implementing the barrier, but what it does not do is cause any thread to actually block. Because the threads are not blocked, they are permitted to do work that is unrelated to the reason for the barrier.

For example, a barrier is often used to implement phases of a computation over a data structure. The synchronization barrier thus is used to block any threads from using the data structure until all threads complete their update to the data structure. In example non-limiting embodiments, threads that have already arrived at the synchronization point may be permitted to perform other useful work that does not involve that data structure while they are waiting for other threads to arrive at the synchronization point.

Example—Red and Green Data Structures

Figure 2:
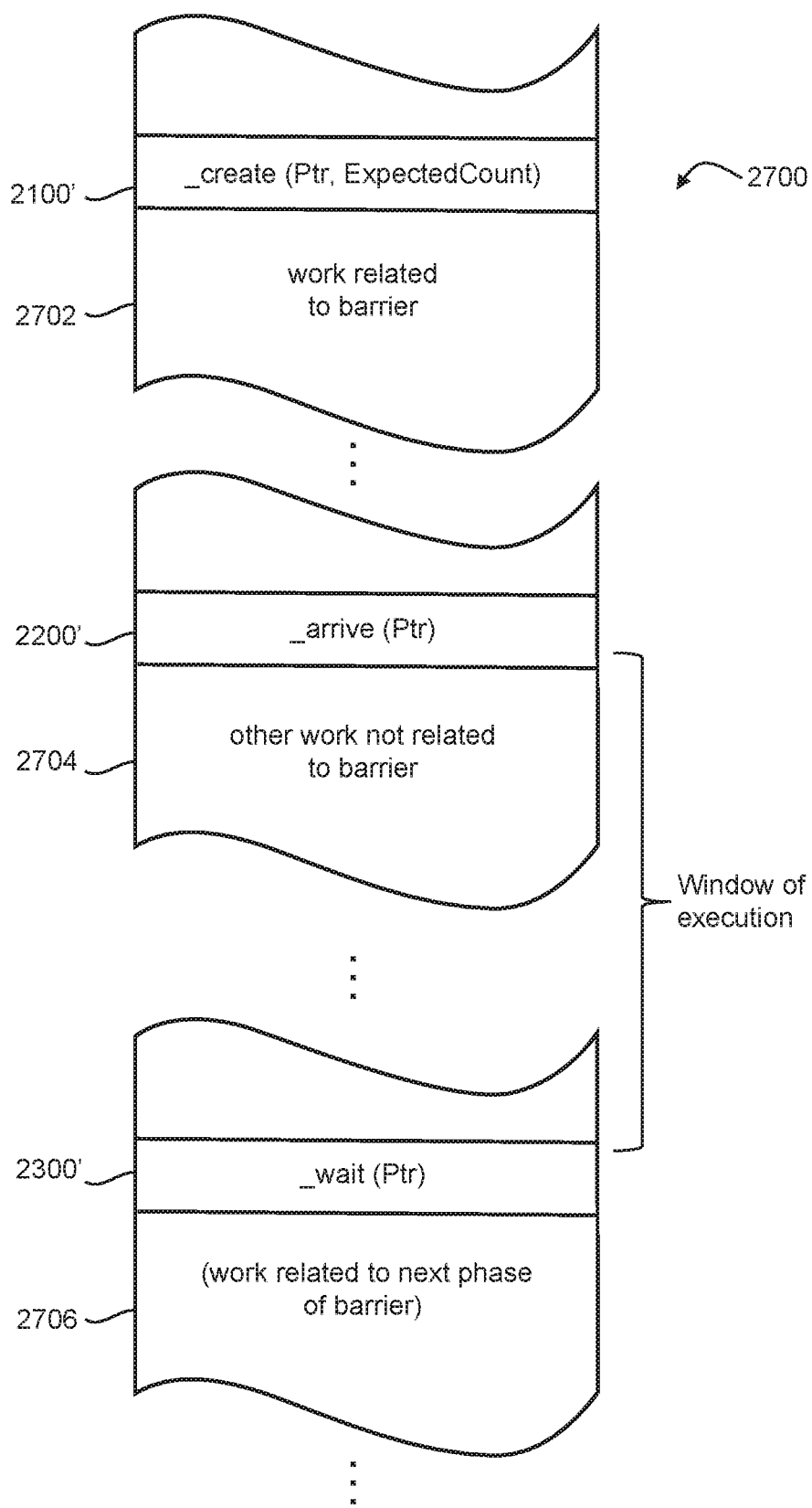
FIG. 2 shows an example non-limiting instruction stream.

As an example illustrated in FIG. 2, assume there are two data structures: even though patent drawings are not in color, we will refer for convenience to the two different data structures the system is updating as the "red" data structure and the "green" data structure. FIG. 2 is actually more general than updating two different data structures (for example, it also applies to updating a single data structure and then doing "other work" unrelated to that data structure while waiting for completion of the updates to that data structure), but it is useful to explain how the process shown could be used to update two different (e.g., "red" and "green") data structures.

A "red" synchronization barrier is created (2100') to provide a barrier for the "red" data structure. Once threads finish updating the "red" data structure (2702) and arrive (2200') at the "red" synchronization point after completing their respective operations on the "red" data structure, they can begin doing other work such as work relating to the "green" data structure (2704) and update that data structure while they are waiting for the "red" synchronization barrier—protecting the "red" data structure work to be complete. An additional, "green" synchronization barrier could similarly be used if desired to protect the "green" data structure.

Once the threads are finish working with the "green" data structure, they can return to working on the "red" data structure—but before doing anything more with respect to the "red" data structure, they need to make sure that the previous processing phase has completed. At that point, if the previous processing as managed by the "red" synchronization primitive has not yet completed, the threads may need to wait (2300') until the processing phase is complete. However, because the "arrive" (2200') and "wait" (2300') atomic operations have been separated in time by an arbitrarily long time that may for example involve thousands of cycles, much useful work (2704) can be performed collectively by any threads that have arrived (2200') at the "red" synchronization point but are not blocked but are instead free to do any useful work other than working on the "red" data structure.

It may turn out that the synchronization primitive never actually blocks any thread. If all of the threads are designed so that upon arriving (2200') at the "red" synchronization point, they begin working (2704) on the "green" data structure, and if the amount of time the threads spend working on the "green" data structure exceeds the amount of time it takes for the last straggling thread to arrive at the synchronization point after working on the "red" data structure, then none of the threads will block. Rather, the synchronization primitive will upon the last straggling thread arriving at the synchronization point, transition state to the next processing phase and when the threads check the state of the synchronization point they will discover that the processing phase has changed and there is no need for them to block. Accordingly, no thread blocks and no cycles are wasted.

Another way of describing this scenario: the synchronization barrier requires all threads or other processes to arrive at the synchronization point at the same time, and does not let any thread or process leave until all of them have arrived. Instead of an "arrive and wait" scenario, example non-limiting embodiments turn the "arrive" event into a window of execution between the "arrive" (2200') and the "wait" (2300'). No threads are permitted to pass the "wait" (2300') until all threads have at least gotten to the "arrive" point (2200'). But this does not prohibit the threads that have "arrived" from doing other tasks (2704) that are not protected by the synchronization barrier.

Once all of the threads and other processors processes arrive at the synchronization point, the example non-limiting synchronization barriers herein reset to start the next processing phase. A synchronization barrier in the example non-limiting implementations is thus a multiple-use object that can be used to manage multiple synchronization points for the same set of threads. Once a first phase is finished, the next phase begins that can be managed by the same synchronization barrier, and then the still next phase begins that may also be managed by the same synchronization barrier, and so on.

In more detail, in one example non-limiting embodiment, each thread participating in the arrive-wait-barrier invokes two functions in order, first the ARRIVE function, and next the WAIT function. The arrive-wait-barrier model splits the barrier participation in a program into three sections: a PRE_ARRIVAL_SECTION, a MIDDLE_SECTION and a POST_WAIT_SECTION, with the following axioms:

---

PRE_ARRIVAL_SECTION
ARRIVE [Arrive-Wait-Barrier Address]
MIDDLE_SECTION
WAIT [Arrive-Wait-Barrier Address]
POST_WAIT_SECTION

--- where in example embodiments:

1. A thread's PRE_ARRIVAL_SECTION load/stores are guaranteed visible to other participating thread's POST_WAIT_SECTION load/stores;

2. A thread's POST_WAIT_SECTION load/stores are guaranteed not visible to other participating thread's PRE_ARRIVAL_SECTION load/stores; and 3. A thread's MIDDLE_SECTION load/stores have no visibility guarantee ordering to other threads In example non-limiting embodiments, Arrive-Wait-Barriers allow for overlapping barriers to be outstanding for resolution.

Such implementation can be performed for a software implemented barrier, a hardware-implemented barrier, or a hybrid hardware/software implemented barrier. For example, the prior CUDA hardware-based _synch primitive could be modified with circuitry changes to implement the arrive-and-wait strategy as two separate atomic functions (arrive, and wait) as described above. However, additional advantages are obtained in the example non-limiting technology by implementing the synchronization barrier as a memory-backed, hardware-accelerated barrier.

Memory Backed Synchronization Barriers

For purposes of clarifying terminology, the term "barrier" can mean different things depending upon level of abstraction. At a lower abstraction level, systems typically have physical storage that implements memory. A facility that implements load and stores is used to read and write to this memory.

At a next level abstraction, when the memory is being used to communicate data between processes, a mechanism may be provided to ensure that all relevant data has been written to the physical memory before a flag is set indicating to another process that the data is available to be communicated to the other process. Without some type of barrier, another process could attempt to read the data before it has been written or while it is being written, and the message could be incomplete or incorrect. Such barriers protecting against this are typically referred to as "memory barriers."

A memory barrier in the above example context is not a synchronization primitive, but rather is a side-effect free instruction that is used to make operations visible in program order on machines such as many modern GPUs that reorder memory transactions. Many modern GPUs have such memory barriers, e.g., an instruction called a "memory fence" such as CUDA's "_threadfence_block( )" command. These memory barriers are at a level of abstraction that is below typical synchronization barriers.

It is possible to use memory barriers to implement synchronization primitives. Locks and mutexes (mutual exclusion objects) are other examples of synchronization primitives. A mutex grants exclusive access to some critical resource one thread at a time. A barrier does something similar but with certain differences.

Generally speaking, as illustrated in FIG. 1A et seq., a synchronization barrier separates different phases of computation where many threads working in a phase arrive at a barrier, blocking those threads until all other relevant threads have completed their work during this phase. Once all threads have arrived at the barrier, the barrier unblocks and a new processing phase begins. Such synchronization barriers are typically defined as a synchronization "primitive" and may in some contexts be considered to be an object. While synchronization primitives may thus in some context be implemented in part using "memory barriers", the discussion in the present specification is intended to separate the concept of a "memory barrier" from "synchronization barrier".

Example non-limiting embodiments use a memory-backed synchronization barrier, i.e., implement synchronization barriers using memory storage (and in some cases, associated memory barriers). By implementing a synchronization barrier as memory storage, the synchronization barrier becomes virtualized in the same way that memory is virtualized. Additionally, there is no practical limit to the number of barrier objects that can be instantiated, at least in the case where any virtual memory location can be used to back and support a synchronization barrier.

Suppose for example that a synchronization barrier object consumes 64 bytes of memory. It follows that a memory-backed synchronization barrier scheme allows the developer to have as many synchronization barriers as available memory can accommodate additional 64-byte long storage elements. In modern GPU architectures with unified memory, the global memory can be exceedingly large, meaning a very large number of synchronization barriers can be accommodated. This is an improvement over hardware-backed synchronization barriers, where only a limited number of barriers typically could be used depending upon the particular hardware implementation, chip design, available chip real estate, etc.

By instantiating synchronization barrier objects in memory, the performance trade-offs discussed above are made substantially easier because implementing objects in memory is a straightforward problem that most developers know how to do. Because a developer can instantiate so many barrier objects (while not actually unlimited, the number is as a practical matter unlimited as a size of main or global memory increases), there is no need to trade off between the number of synchronization barriers and task capacity.

Because synchronization barriers are stored, i.e., implemented in memory in example embodiments, they benefit from memory sharing and the memory hierarchy as well. Previous hardware synchronization barrier circuitry was often implemented directly within the processor. Thus, any such hardware-implemented barriers generally did not cross between different processors. In other words, each processor could have its own hardware-based barriers that it would use to manage multi-threaded tasks executing on that processor, but those hardware barriers were of no help in coordinating the activities outside of the particular processor, e.g., in a system of multiple processors which might have been involved in parallel implementation of the same processing phase. Such coordination typically required use of shared global (CPU) main memory, which could be slow and have other performance issues.

In contrast, example non-limiting embodiments implementing a synchronization barrier using memory instructions make it possible to support functionality outside of the confines of a processor, GPU or SOC (system-on-a-chip). In particular, synchronization barriers can now be implemented on any level of the memory hierarchy, including for example levels that are shared across multiple cores, multiple streaming multi-processors, multiple GPUs, multiple chips, multiple SOCs, or multiple systems and in some instances, cached in memory caches based on such hierarchies.

Example Non-Limiting Memory-Backed System Implementation

Figure 2A:
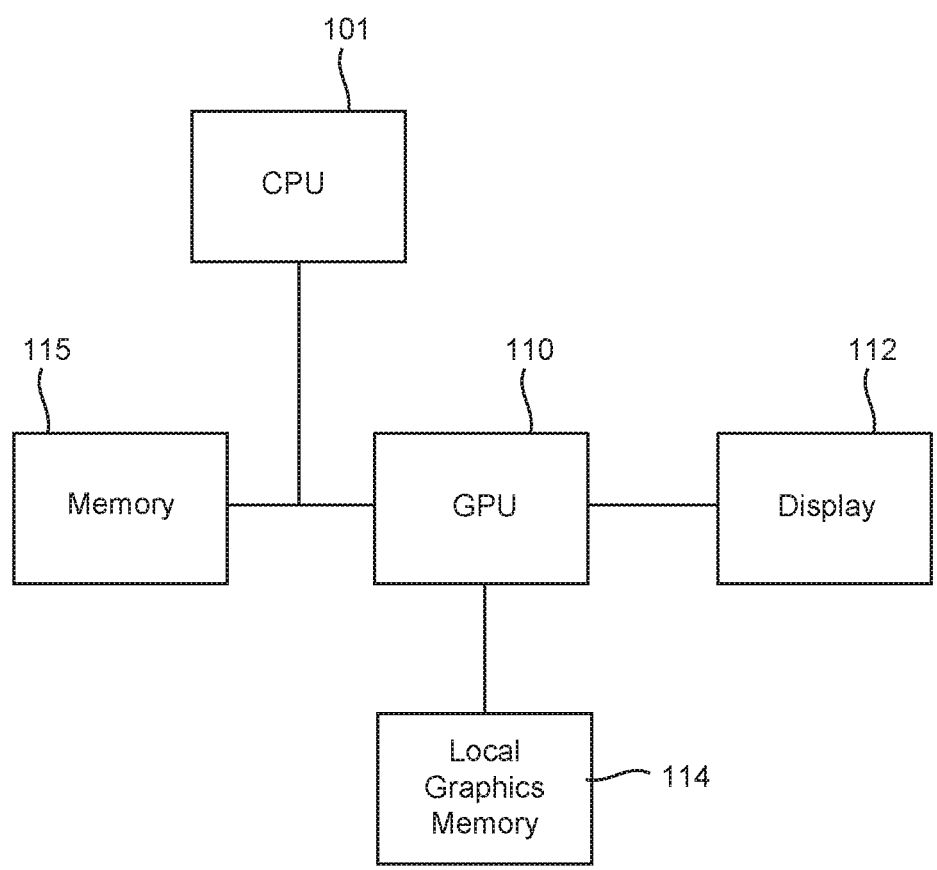
FIGS. 2A & 2B are block diagrams of an example non-limiting system that employs the present synchronization barrier technology.
Figure 2B:
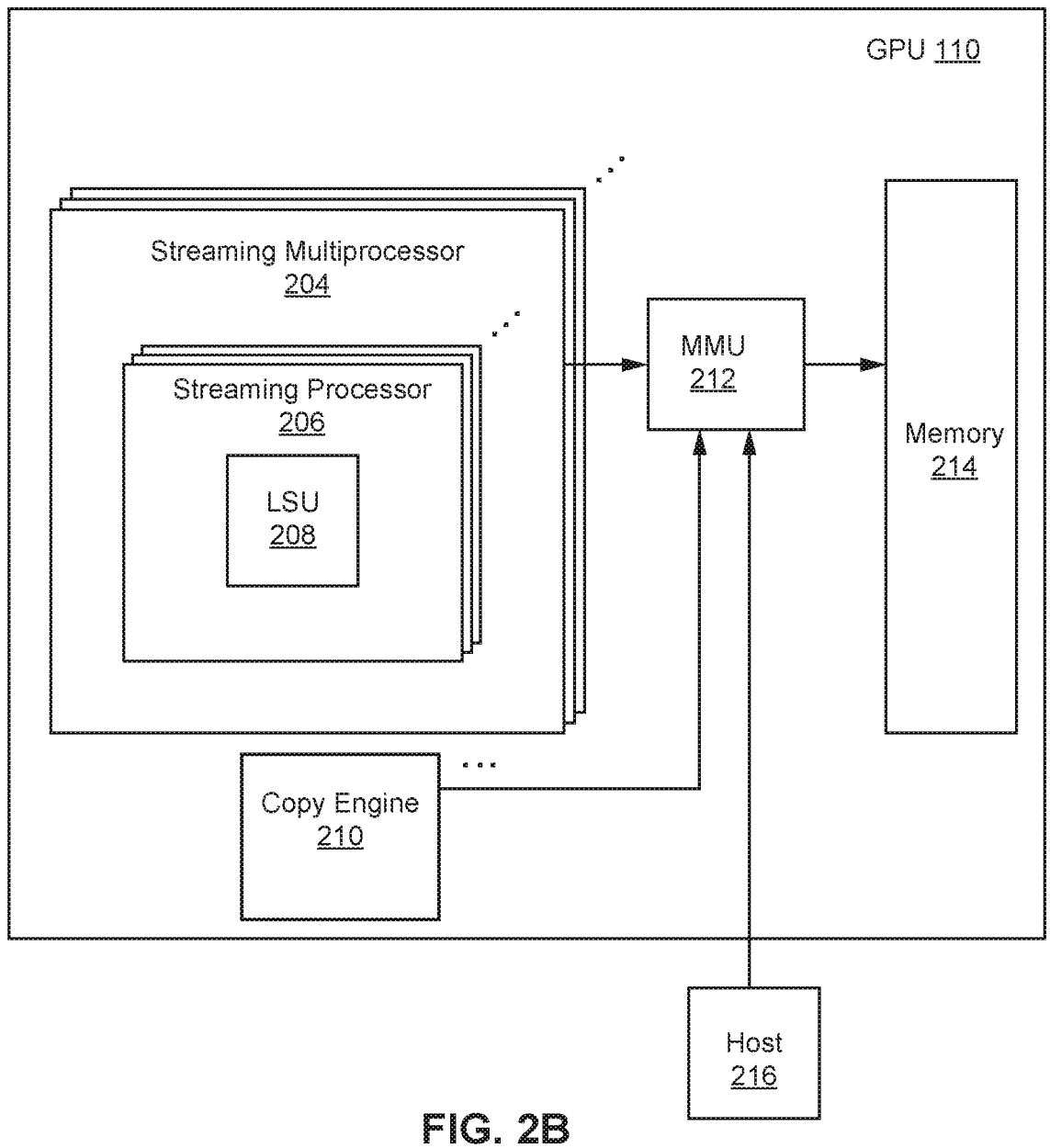

For example, referring to the FIG. 2A example system showing a CPU(s) 101, a GPU(s) 110 with local graphics memory(ies) 114, a main memory(ies) 115, and a display(s) 112, the synchronization barrier could be stored within local graphics memory 114 and be shared by all streaming multiprocessors (SMs) 204 (see FIG. 2B) within the GPU 110, or it could be stored in main memory 115 and shared between the CPU 101 and the GPU 110. In more detail, the local graphics memory 114 may be organized into a different hierarchies such as level 3 cache, level 2 cache, level 1 cache, shared memory, etc., all managed by a memory management unit (MMU) 212 as shown in FIG. 2B. Since the memory hierarchy is used to determine what storage locations are shared between which resources, storing a synchronization barrier at different levels of the memory hierarchy controls which computing resource(s) can share the synchronization barrier (and similarly, which computing resources are not able to access the barrier).

Such memory-implemented synchronization barriers can therefore be used to synchronize between threads running on a common core 206, between different warps running on different cores, different processes running on the same or different GPUs 200, the same or different SOCs, etc. Thus, a particular barrier is no longer limited to synchronizing threads processed in parallel on a particular processor, but may also be used to synchronize many more threads or other executions across any number of different cores, GPUs, processors, processor architectures, chips and systems.

This capability is enabled by implementing the memory-backed synchronization barrier at an appropriate level of the memory hierarchy so that it can be accessed and shared by the multiple processes and/or processor(s) while being protected for example by commonly-used memory barriers. Furthermore, in terms of scalability, as the memory hierarchy expands, more and more threads can be using these synchronization barriers whereas smaller hierarchies may support more limited scopes of barrier usage.

Using Synchronization Barriers to Synchronize Hardware

An additional limitation of most prior hardware-synchronization barrier implementations was that they were able to block on software executions but not necessarily on hardware processes. One process typically performed by prior GPU hardware is copy operations. While a processor can use memory commands such as loads and stores performed by load/store unit 208 to copy from one memory location to another, so-called "copy engines" 210 as shown in FIG. 2B or "direct memory access (DMA) controllers (e.g., hardware accelerated or hardware-based copy operators) have long been used to accelerate copying of data to and from memory. In many systems, software can send commands to a dedicated copy/DMA engine 210 that performs the data transfer. Such a copy engine may copy data for a thread out of a plurality of contiguous locations in memory 214 corresponding to each offset from a base address of the thread and contiguously store the data into system memory. The copy engine 210 may also copy data for a thread from locations in system memory and store the data into GPU memory 214. See e.g., US Patent Publication No. 20140310484.

Often, such copy operations need to be completed before a next processing phase can begin since for example moving to the next processing phase may depend on completion of an update to a data structure in memory. However, since prior implementations of synchronization barriers were implemented based on blocking threads and not hardware, an additional mechanism was needed beyond the hardware-based synchronization primitives to ensure the proper data was present after all threads monitored by the synchronization primitive completed before the next processing phase could begin. In other words, in past traditional approaches such additional, hardware-based machines (e.g., copy engine 210 or any other hardware) generally could not participate in the same synchronization barrier process as executing threads. While a prior solution was to wrap a software operator around the hardware-based DMA/copy operator so the software operator would complete only once the hardware operator was finished, this approach imposed additional constraints on the software design that were not always desirable or efficient.

In contrast to such prior approaches, one example non-limiting feature integrates direct memory access (DMA) copy operations performed by a copy engine 210 (or similar or other operations performed by hardware such as a computation engine) into the software-implemented but hardware-accelerated synchronization primitive so the same synchronization primitive can be used to provide a barrier for software processes, hardware based processes, and hybrids of hardware- and software-based processes.

Thus, one example non-limiting feature of the implementations herein is synchronizing copy engine 210 transactions with synchronization barrier technology. Such integration can for example be performed using purely hardware-based barrier implementations, but the example non-limiting memory-backed synchronization barrier technology described herein provides additional benefits in terms of performance and flexibility over a purely hardware implementation.

In one example non-limiting embodiment herein, hardware operations such as copy engine 210 operations once initiated behave, from the standpoint of the synchronization barrier, as if they are full-fledged threads, i.e., as if they were an execution stream of software instructions that a programmer has written or a compiler has compiled. The implementation is elegant in that it is simple to describe: the hardware operation behaves as if it is "morally" a thread. In some example non-limiting embodiments, there can be many fine-grained hardware operations such as copy operations being performed simultaneously and concurrently, and they may all be synchronizing on a common synchronization barrier(s).

Using massively-parallel modern GPUs, the most common way to perform complex computations is collectively. Thus, the computations may be performed collectively using a large number of threads which may, in turn, launch collectively an even larger number of hardware-based operations such as DMA operations by one or any number of copy engines 210. For example, suppose 100 threads are concurrently executing, and each of these 100 threads initiates a DMA operation by an associated copy engine(s) 210. Using example non-limiting features of the technology herein, the same synchronization barrier can synchronize the 100 DMA operations and the 100 threads (i.e., from the standpoint of synchronization by the synchronization primitive, the DMA operations "look" like threads), providing synchronization for 200 total processes (100 software threads and 100 hardware-based DMA operations). Such functionality is provided, e.g., by hardware acceleration circuits that provide interfaces between the MMU 212 and the copy engine(s) 210 to enable the copy engine(s) 210 to cause values of the memory-backed synchronization primitive to change (e.g., increment and reset counter values). The present technology is extensible so any number of fine-grained DMA operations can synchronize on the same barrier.

In a massively parallel architecture capable of supporting many threads, it might be inefficient to program each individual thread to wait for each hardware-based operation to complete. The current example non-limiting technology instead provides a synchronization primitive that allows the large number of threads (and, in some embodiments, also copy operations) to collectively wait for completion of one or more hardware-based (e.g., copy) operations on which the next processing phase is dependent.

In this instance, the barrier primitive is a different type of mechanism than a semaphore or a flag (which was sometimes used in prior approaches for synchronizing with hardware-based processes), in that the new synchronization primitive provides a collective synchronization. It is different from one thread setting a flag or a semaphore for another thread. It instead allows N threads to block on completion of potentially M hardware-based copy operations, where N and M are any non-negative integer. Such collective functionality does not necessarily need to be limited to software-based or memory-backed barrier technology, but could be implemented in software, hardware or both.

Hardware Accelerated Synchronization Barrier

To enable the functionality above and provide higher performance, example non-limiting embodiments provide a hardware-accelerated implementation of memory-backed barriers. The implementation is invoked by software commands but integrates additional hardware-functionality such as for example hardware-based copy into the same synchronization barrier mechanism used to block software processes such as threads.

While it would be possible to implement such a function entirely in software, in example non-limiting implementations, hardware acceleration is used to more efficiently implement at least the barrier resetting function and is also used in order to interface with hardware-based processes such as DMA copy engines and thus allow hardware functions to reset the barrier. In some embodiments, a dedicated hardware-based accelerator could be used to cache the synchronization barrier.

In prior software-implemented versions, the last-to-arrive thread recognize that it was the last-to-arrive and modified a counter accordingly by adding the compliment of the current value of the counter in order to reset the counter to a starting value. As an example, see the Java "Phaser" commonly implemented in Java virtual machines. DMA engines in some example implementations are not written in software. Since the DMA engines may in some cases be responsible for resetting the barrier and since they are not software, such resetting is in these implementations is desirably performed in hardware. For this reason, example non-limiting embodiments provide a hardware-accelerated reset operation. However, other example non-limiting implementations of the technology herein could be applied to phasers, latches or other synchronization primitives other than barriers. Such technology could also be applied for use with semaphores.

Software Implementation

Figure 3:
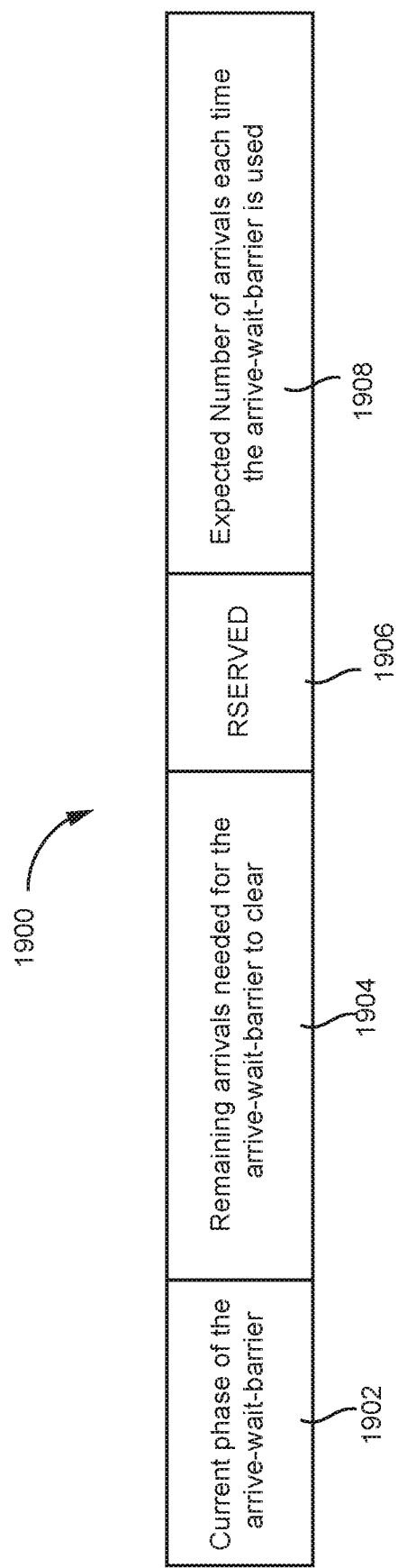
FIG. 3 is a block diagram of an example non-limiting memory-backed synchronization barrier primitive.

In example non-limiting embodiments, each Arrive-Wait-Barrier state is an implementation-defined (e.g., 64-bit) data-structure 1900 stored in memory. As shown in FIG. 3, this data structure 1900 holds the following:

1. The expected number of arrivals for each time the barrier is used (field 1908).
2. The remaining number of arrivals required for the barrier to clear (counter field 1904)
3. The barrier phase (for barrier reuse) (field 1902).

Arrive-Wait-Barriers in example non-limiting implementations allow individual threads to cooperate, so the counts of fields 1904, 1908 may be expressed as thread counts.

As FIG. 3 shows, the first field 1902 is a phase counter that indicates the current processing phase of the arrive-wait barrier. Upon resetting the barrier, the phase counter 1902 can be incremented to the next phase number. In one example implementation, the phase counter 1902 can be a single bit state flag (i.e., a one-bit counter) that is flipped (incremented) each time the barrier is reset. Such a state flag can be used into indicate to threads that the state of the barrier has changed to the next processing phase—meaning that the threads do not (or no longer need to) block on the barrier. In other example non-limiting embodiments, additional resolution of the phase indicator might be desired for example to distinguish between more than just the current phase and a next successive phase. Such other implementations could for example increment a multi-bit count each time the barrier is reset, thereby keeping track of which of N processing phases is currently in effect, where N is an integer.

As further shown in FIG. 3, an additional field comprises an arrival counter 1904 that indicates how many threads/processes have arrived (or in one implementation, the remaining arrivals needed for the barrier to clear). In one example implementation, each time a thread or other process arrives at the barrier, the arrival counter 1904 is incremented. When the arrival counter 1904 increments to a predetermined known value), this indicates that all threads and processes have arrived, and the barrier can change state and move to the next processing phase.

When the last straggling thread (or hardware process) arrives and the barrier is satisfied/reset, the arrival counter 1904 may be reset to an initial value contained for example in the third field 1908 in the example non-limiting embodiment shown in FIG. 3—namely an expected number of arrivals each time the arrive-wait barrier is used.

As discussed below, example non-limiting embodiments permit software to dynamically change the values of arrival counter 1904 and "Expected number of threads" field 1908 after the barrier is created.

In example non-limiting embodiments, the data structure 1900 shown in FIG. 3 can be stored anywhere in memory. As discussed above, the type of memory/hierarchical level of the memory used to stored data structure 1900 is selected to provide desired scope of sharing between threads. When a thread implements a synchronization barrier of the example non-limiting embodiment herein, the synchronization primitive call in the thread includes, directly or indirectly, a memory address for the stored instance of the data structure 1900 representing the synchronization primitive. This is different from prior hardware-based synchronization primitives where the synchronization primitive call would likely set forth a reference number or ID. A memory address (which may be a physical or virtual memory address, depending upon the system) indicates where in memory the instantiation of the synchronization primitive 1900 referenced by the thread is found.

Example Hardware Accelerated Implementation

Figure 4:
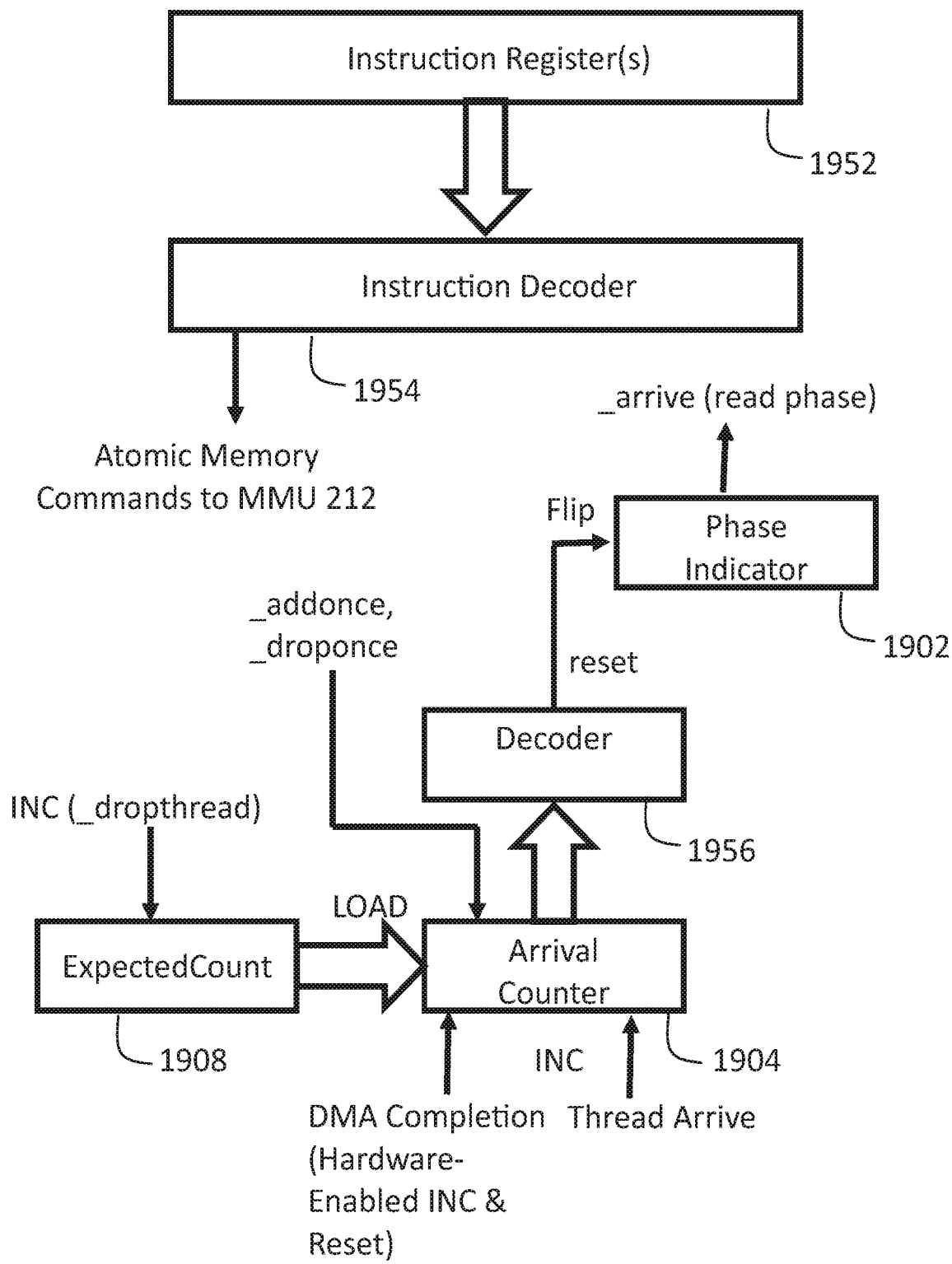
FIG. 4 is a block diagram of an example non-limiting combination of hardware and software functions that can be used to manage the FIG. 3 barrier.

FIG. 4 is a block diagram of an example non-limiting hardware-accelerated memory backed implementation of the FIG. 3 synchronization primitive 1900. As discussed above, the Current Phase Counter 1902, Arrivals Counter 1904, and Expected Number storage field 1908 are stored in memory and are accessible by the load/store unit 208 which in example embodiments is able to perform atomic operations (stored in a processor instruction register 1952 and decoded by a conventional instruction decoder 1954) such as (arithmetic functions such as atomicAdd( ), atomicSub( ), atomicExch( ), atomicMin( ), atomicMax( ), atomicInc( ), atomicDec( ), atomicCAS( )); bitwise functions such as atomicAnd( ), atomicOr( ), atomicXor( )); and other functions. Such atomic operations allow a streaming multiprocessor to change the value of the synchronization primitive 1900 "in place". MMU 212 is modified to include hardware circuitry that allows DMA controller/copy engine 210 to similarly modify the arrival counter 1904 "in place" and to reset the synchronization primitive 1900 if the copy engine's operation causes the arrival counter decoder 1956 (which functions as a comparator that compares the count of the counter with a predetermined value and resets the counter and the phase indicator based on results of the comparison) to determine that no more threads or copy engine operations are awaited before the synchronization barrier can reset. In such instance, the decoder 1956 initiates a hardware-controlled reset of the synchronization primitive 1900 instance to "flip" the phase indicator 1902 and reload the Expected Number 1908 into the Arrival Counter 1904. In one example embodiment, the LSU 208 and/or MMU 212 circuitry performs a kind of direct memory access atomic operation to initiate/perform appropriate atomic operations on the synchronization primitive 1900 instance stored in memory to make these changes.

Thus, in example non-limiting embodiments, the processor architecture is modified to provide additional circuitry that ties hardware-based processes such as DMA into the synchronization barrier implementation, such that the hardware is able to reset the synchronization barrier blocking memory when it has completed its DMA task and recognizes that it is the last straggling process that is needed to move to the next processing phase. In example non-limiting implementations, the hardware modifications do not need to concern themselves with separating arrival with wait as discussed above because, in general, the hardware DMA controller will return and be ready for a next task once it has completed the previous one. However, count maintain by the barrier's completion counter 1904 will in example non-limiting implementations include both the number of threads needed to complete and the number of DMA hardware operations needed to complete—that is, the counts 1904, 1908 do not differentiate between thread count and DMA/copy engine count, but rather each include a single value that aggregates the number of threads and the number of copy operations that must complete for the barrier to reset.

Example Non-Limiting Implementation

Example non-limiting embodiments herein implement changes to the Instruction Set Architecture (ISA) to include instructions for accessing a new synchronization primitive that references a memory-backed synchronization barrier storage in memory. Furthermore, in example non-limiting implementations, instead of one primitive call, a thread will include two different primitive calls: an "arrive" primitive call to the barrier, and a "wait" primitive call to the barrier. Between those two calls, as explained above and shown in FIG. 2, the thread may include instructions unrelated to the barrier that can be executed without violating the barrier.

During initialization, the system will initially set up the synchronization barrier instance in memory and store the appropriate data there that the system needs to retain in order to implement the barrier (e.g., arrival count, phase count). Typically, SDK (software development kit) provided by the system designer may include a library including these various function calls to initiate a synchronization barrier. Similarly, the ISA of the processing system is modified to include new instructions for the synchronization barrier arrive and synchronization barrier wait.

In one example non-limiting embodiment, the following software functions may be used to manage an arrive-wait-barrier primitive 1900 instance stored in memory:

a _create function 2100 (see FIG. 5A) is used to setup an arrive-wait-barrier in memory an _arrive function 2200 (see FIG. 5B) is used by a thread to indicate its arrival at an arrive-wait-barrier. The barrier phase is returned by this function for use in the _wait function.

a _wait function 2300 (see FIG. 5C) is used to wait for an arrive-wait-barrier to clear for the provided phase a _dropthread function 2400 (see FIG. 5D) permanently removes a thread from an arrive-wait-barrier. This is useful when a thread exits.

an _addonce function 2500 (see FIG. 5E) adds to the count of an arrive-wait-barrier by a specific amount.

a _droponce function 2600 (see FIG. 5F) reduces the count of an arrive-wait-barrier by a specific amount.

Additionally, some non-limiting embodiments include an additional instruction ARRIVES.LDGSTSBAR.64 that signals that all DMA transfers from this thread have completed, and updates the arrival count in the arrive-wait-barrier accordingly.

_create

Figure 5A:
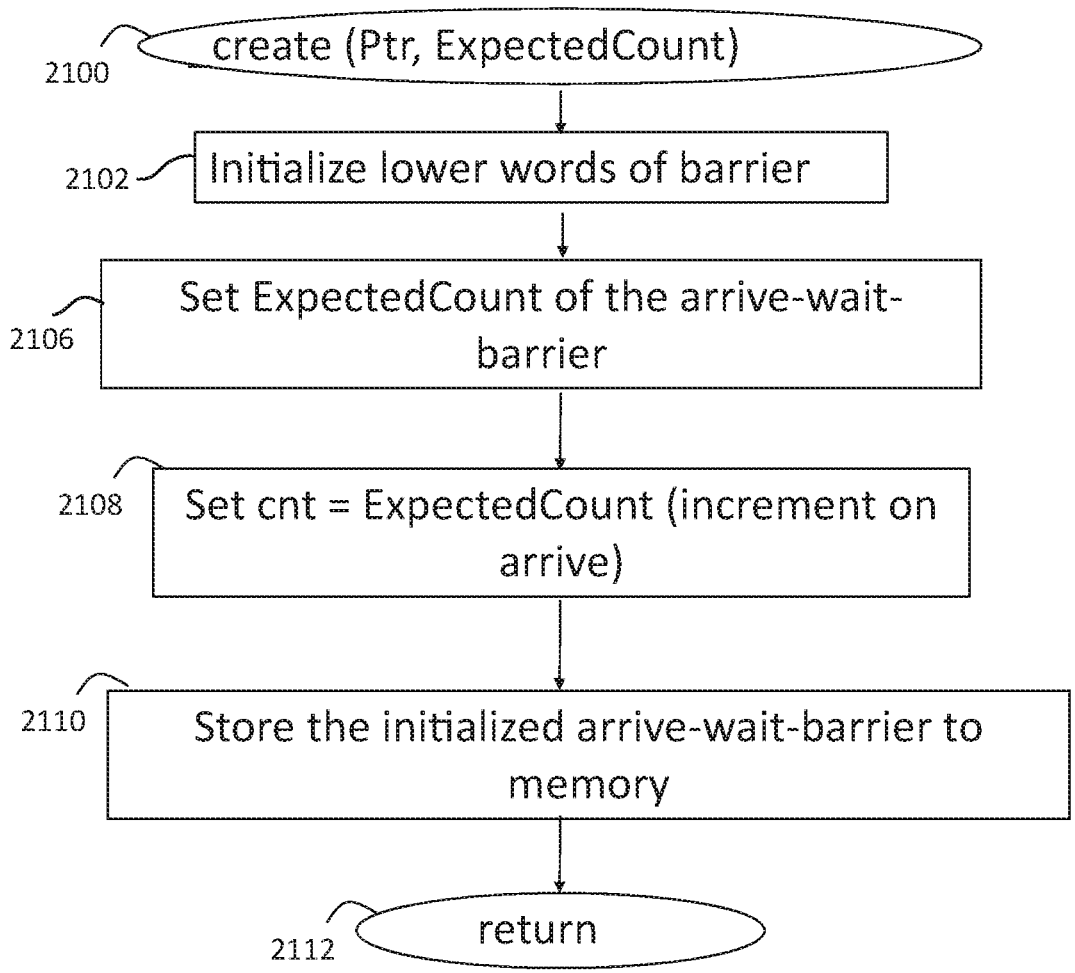
FIGS. 5A-5F show example flowcharts of operations associated with barrier functions.

FIG. 5A shows an example _create function 2100 that sets up a new barrier. In this example, the invoking code is responsible for invoking _create in only one thread. The _create function 2100 takes as parameters "Ptr" (the direct or indirect memory location where the barrier data structure is to be stored in memory) and "ExpectedCount" (the expected total number of the collection of threads and DMA operations that are synchronized by this particular barrier). In the example shown, the counters in the data structure are initialized (2102). The barrier counter is set to ExpectedCount (increment on arrive) (2108) and the now-initialized barrier is stored to the specified location in memory (2110). The function then returns (2112). As described above, in one example embodiment the barrier can be stored to shared memory, but in other embodiments it can be stored to any desired memory in the memory hierarchy consistent with the scope of synchronization.

A more specific example is:
_create(BarPtr, NumThreads);
input: BarPtr, NumThreads;
Initializes the barrier for the number of threads specified.
Core primitive: co-operative thread array (CTA) wide split barrier (allocated through CTA wide synchronization)
BarPtr=pointer to allocated barrier stored in shared or any other memory location where opaque barrier state is stored
NumThreads the number of threads participating in this barrier that need to arrive before the wait is cleared.

_arrive

Figure 5B:
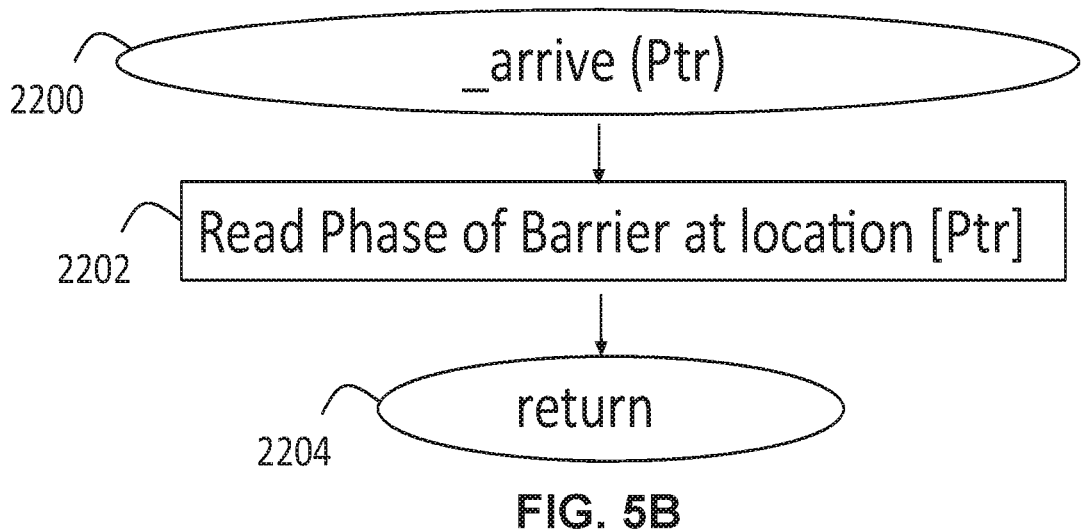

FIG. 5B shows an example _arrive function 2200 that indicate that a thread has arrived at a barrier and returns the barrier phase to be used for the _wait( ) function 2300. In the example shown, _arrive function 2200 reads the phase of the barrier at memory location [Ptr] and stores the phase locally (e.g., in a register the thread has access to). Note that in the example non-limiting embodiment, from the software perspective the _arrive function 2200 does not change the state of the barrier, but merely reads the current phase value from the barrier. However, in the example implementation, calling the _arrive function 2200 will have the effect (based on hardware acceleration associated with the implementation of barriers) of reducing the number of threads the barrier's thread counter indicates to thereby "register" with the barrier that the thread has arrived at the synchronization point and thus that the barrier is no longer waiting on this particular thread to reach its defined synchronization point.

In the example non-limiting embodiment, the _arrive function 2200 call can be placed anywhere in a thread, and it is the position of the _arrive function 2200 call that defines the synchronization point within the thread. The developer and/or an optimizing compiler take care to ensure that the number of threads containing an _arrive function call 2200 (+DMA or other appropriate hardware calls) matches the Expected Number of Arrivals programmed into the barrier.

A more specific non-limiting example:
_arrive(BarPhase, BarPtr);
input: BarPtr;
output: BarPhase
Indicates that a thread has arrived; returns barrier phase to be used for the Wait instruction.

In an example embodiment, a Wait instruction can be initiated by the copy engine 210 independently of any software thread of execution. This can occur by hardware in the MMU 212 or LSU 209 generating a fused atomic load/store command (LDGSTS) to shared memory that essentially performs a direct memory access ("DMA") by the hardware engine to the instance of the primitive stored in shared memory.
_wait(BarPtr, BarPhase)

Figure 5C:
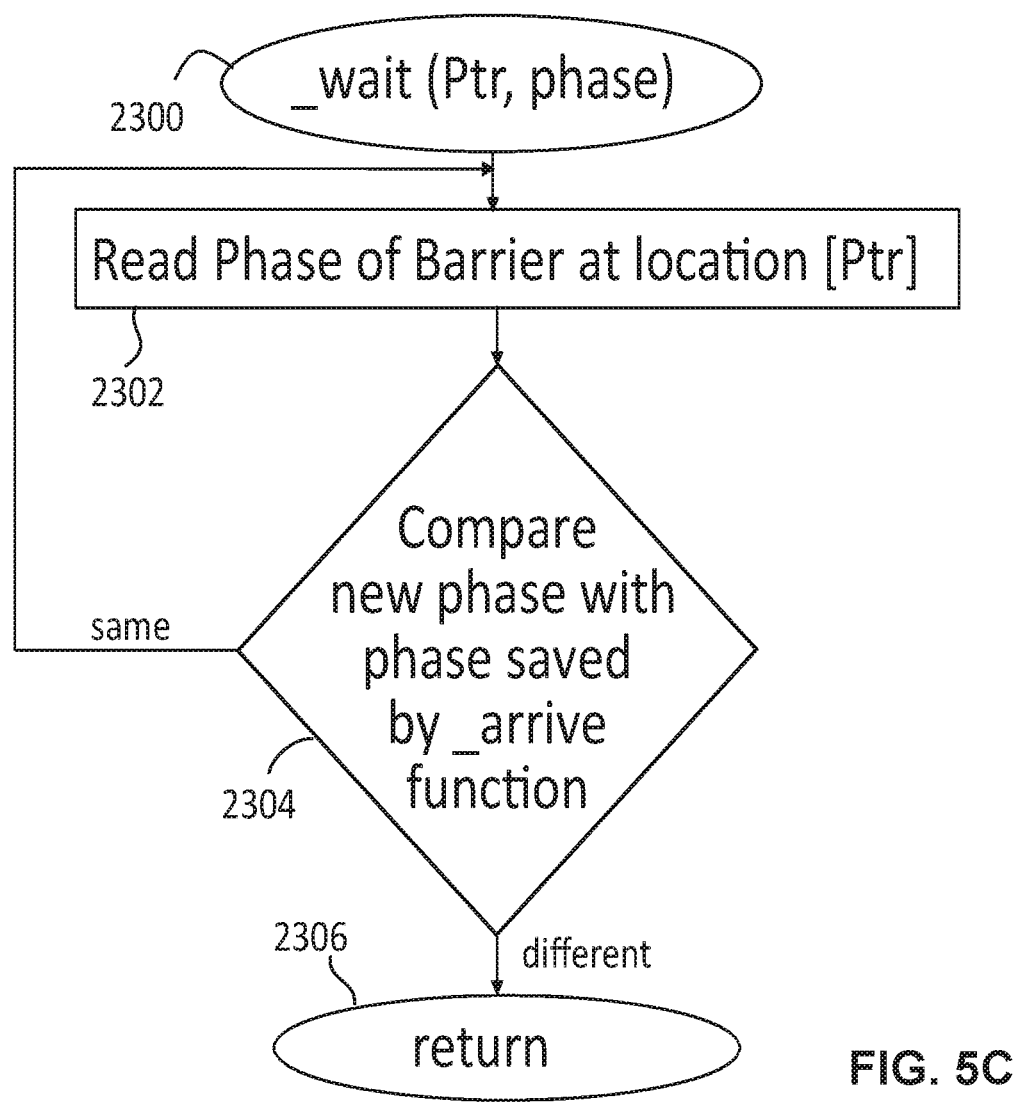

As FIG. 5C shows, the _wait function 2300 waits for the arrive-wait-barrier to clear for the phase provided. The _wait function 2300 again reads the phase of the barrier at memory location [Ptr] and compares it (2304) to the phase previously read by the _arrive function 2200. FIG. 5C thus defines an endless loop that waits until the barrier phase changes before allowing the thread to proceed. A thread that executes _wait function 2300 will block on the barrier until the barrier phase changes.

_wait(BarPtr, BarPhase) needs to consume the BarPhase that was returned by a prior call to _arrive. In a non-limiting example embodiment in which _arrive made side-effects, then _wait also has to make those side-effects. But far more typically, the reverse is going to happen—namely _wait makes side-effects and _arrive has to also make those same side-effects.

In the particular example shown, since the _wait function 2300 uses a value retrieved by an _arrive function 2200, a _wait 2300 should be called only after _arrive 2200 is called. The two functions could be called one immediately after the other, or any number of instructions or other functions not related to the barrier could be placed between the _arrive function 2200 call and the _wait function 2300 call. The developer (and/or an optimizing compiler) may wish to put useful work between an _arrive function call 2200 and a wait function call 2300 so that processor cycles are not needlessly wasted. If the thread calls _wait function 2300 after the barrier phase state has already changed, the thread will not block on the barrier but will instead execute the next instruction after the function call with only a short (e.g., one or two cycle) delay involved in performing operations 2302, 2304 of FIG. 5C.

Figure 5D:
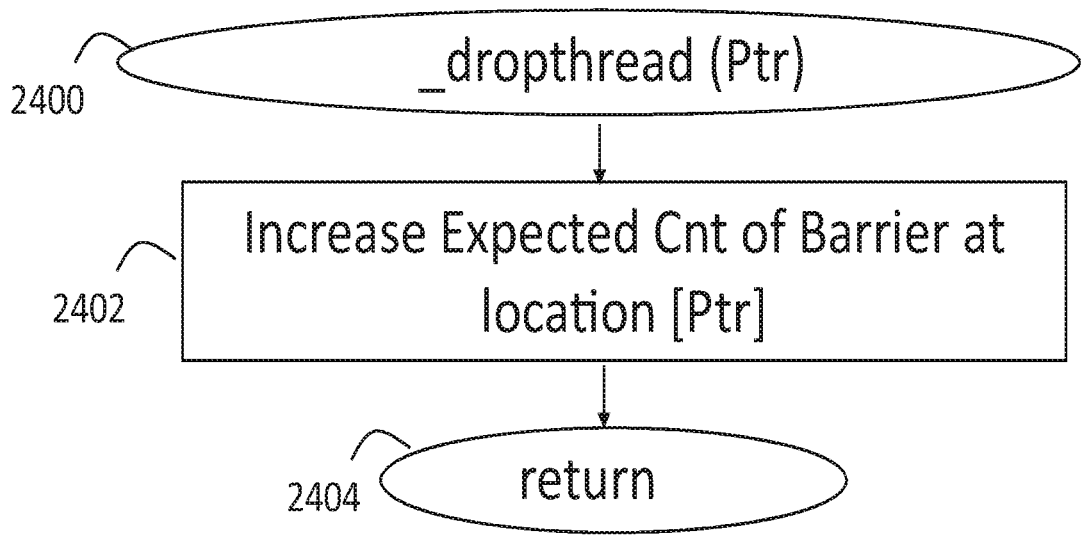

A more specific example:
_wait(BarPtr, BarPhase)
input: BarPhase
Wait until all expected arrives have occurred for the barrier for the specified phase of the barrier.
for one thread for one barrier BarPtr:
Every Wait(BarPtr) has a corresponding Arrive(BarPtr), and the BarPhase out of Arrive(BarPtr) is provided as the input to _wait(BarPtr) a call to _wait(BarPtr) cannot follow a _wait(BarPtr) without an intervening _arrive(BarPtr)
a call to _arrive(BarPtr) should not follow an _arrive(BarPtr) without an intervening _wait(BarPtr)
_dropthread The _dropthread function 2400 of FIG. 5D is used in example embodiments to permanently remove a thread from an arrive-wait-barrier. This function is useful when a thread needs to exit. The effect of this function is to decrease (decrement) the Expected Number of Arrivals value in the barrier so the barrier will no longer wait on this particular thread (block 2402). In the particular example shown, the operation increments the value stored in the barrier to thereby decrease the number of counts required to reach a "waiting on no more threads" count.

A more specific example:
_dropThread (BarPtr)
input: BarPtr;
Removes a thread from the barrier. Useful for when a thread wants to exit.
_addonce (BarPtr, Count)

Figure 5E:
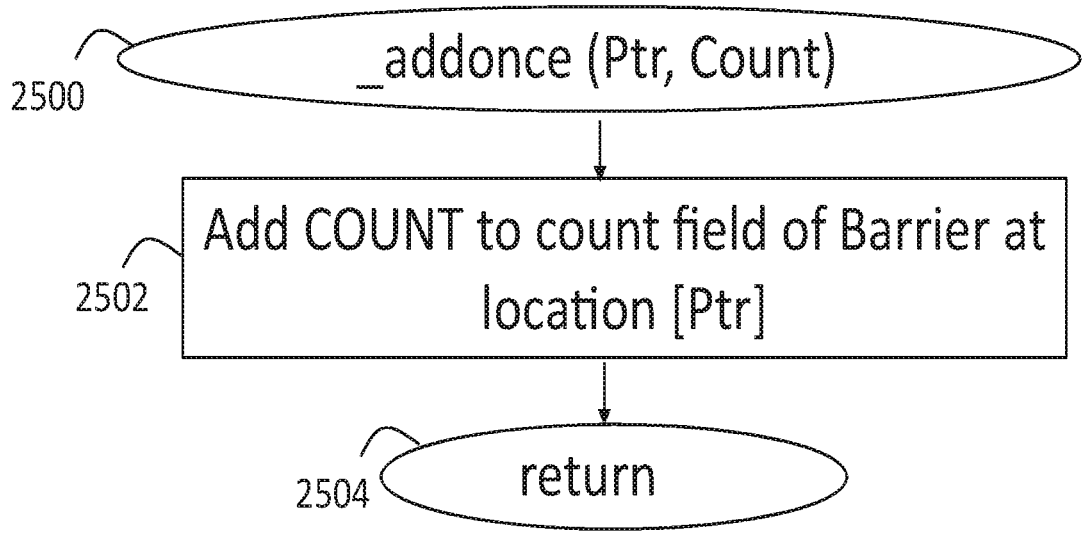
Figure 5F:
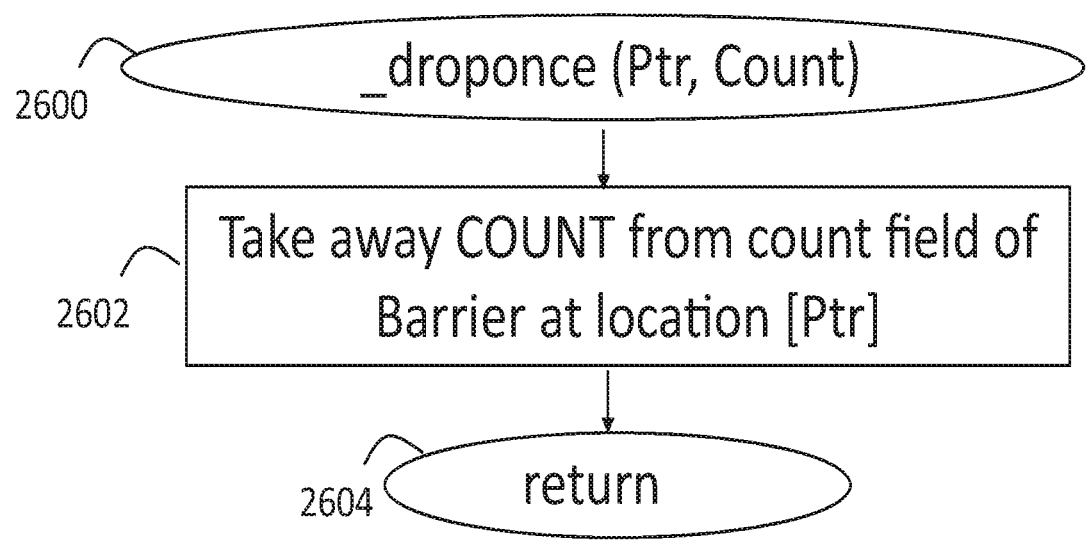

The _addonce function 2500 of FIG. 5E adds to the count of the arrive-wait-barrier by a specific amount, and the _droponce function 2600 of FIG. 5F reduces the count of the arrive-wait-barrier by a specific amount. Any overflows may be handled explicitly by software.

A more specific example:
_add(BarPtr, AddCnt)
input: BarPtr, AddCnt;
Adds AddCnt additional expected arrivals for this barrier. Added only for a single use of the barrier.
For all threads participating in the barrier:
The sum of all AddCnt matches the number of _arrive( ) calls.
The thread providing the _addCnt may be different from the thread that executes the _arrive( )
A thread should not execute _add(BarPtr) between _arrive(BarPtr) and _wait(BarPtr)
Other ISA approaches are possible. The main approaches differ in how the expected barrier arrival count is specified. Some options include:
expected arrival specified at barrier creation
expected arrival specified each time barrier is used by the Arrive (like existing SM CTA barrier, all threads must specify the same expected arrival)
expected arrival specified each time barrier is used by the Wait (like existing SM CTA barrier, all threads must specify the same expected arrival)
hybrid: expected arrival specified at barrier creation, but additional expected arrivals can be added by the Arrive.
Example Non-Limiting Micro-Architecture (which may be used to implement the FIG. 4 block diagram):

Barrier State
* phase: phase of the barrier.
* count: barrier count.
* ThreadCnt: the number of threads participating in this barrier
_create(BarPtr,InitCnt)
    barrier[BarPtr].initCnt = initCnt;
    barrier[BarPtr].cnt = initCnt;
    barrier[BarPtr].phase = 0;
_add(BarPtr, addCnt)
    // increment arrival count
    barrier[BarPtr].cnt += addCnt;
Arrive_function(BarPtr) // this is not part of the API in one embodiment
    // decrement arrival count
    barrier[BarPtr].cnt--;
    // check if arrival is clearing barrier
    if (barrier[BarPtr].cnt == 0) {
    // update phase and reset count
    if (barrier[BarPtr].phase == 0) {barrier[BarPtr].phase = 1;} else {barrier[BarPtr].phase = 0;}
    barrier[BarPtr].cnt = barrier[BarPtr].init;
    // unstall all warps waiting on barrier
    unstall(BarPtr);
}
Arrive(BarPtr, addCnt, BarPhase)
    // return phase (optional)
    BarPhase = barrier[BarPtr].phase;
    // Do arrive function
    Arrive_function(BarPtr);
LDGSTS_Arrive(BarPtr)
    // Do arrive function

```
    Arrive_function(BarPtr);
BarWait(BarPtr, BarPhase)
    // if barrier is in same phase, it has not yet cleared then stall,
      otherwise keep going.
    if (barrier[BarPtr].phase == BarPhase) { stall(BarPtr); }
DropThread(BarPtr)
    // thread is removing itself from the barrier
    barrier[BarPtr].initCnt--;
    // Do arrive function
    Arrive(BarPtr);
```

Cooperative data movement without threadsync. DMA Task based split barrier

Programming model can be one that matches that of a multi-thread barrier except that the barrier is split.

An existing multi-thread barrier can be described as:
<PRE>
BARRIER
<POST>

The visibility rules:
A thread's<PRE> load/stores are guaranteed visible to other participating thread's<POST> load/stores.
A thread's<POST> load/stores are guaranteed not visible to other participating thread's<PRE> load/stores.

The split multi-thread barrier can be described as:

<PRE>
ARRIVE
<MIDDLE>
WAIT
<POST>

The visibility rules (the first two are the same as above)
A thread's<PRE> load/stores are guaranteed visible to other participating thread's<POST> load/stores.
A thread's<POST> load/stores are guaranteed not visible to other participating thread's<PRE> load/stores.
A thread's<MIDDLE> load/stores have no visibility guarantee ordering to other threads (at least not any visibility guarantees provided by this particular barrier).

The LDGSTS "DMA" instruction is logically treated like an independent thread that was "forked" by the caller thread and executes a LDG/STS/ARRIVE, after which it "dies".

Visibility Issues with Split Barrier

A split barrier means multiple split barriers can be overlapping. All of the following overlaps are allowed and functionally correct with no deadlock (see also FIG. 6).

pipelined

| Thread 0 | Thread 1 |
|---|---|
| Arrive (BarA) | Arrive (BarA) |
| Arrive (BarB) | Arrive (BarB) |
| Wait (BarA) | Wait (BarA) |
| Wait (BarB) | Wait (BarB) | nested

| Thread 0 | Thread 1 |
|---|---|
| Arrive (BarA) | Arrive (BarA) |
| Arrive (BarB) | Arrive (BarB) |
| Wait (BarB) | Wait (BarB) |
| Wait (BarA) | Wait (BarA) | different order per thread

| Thread 0 | Thread 1 |
|---|---|
| Arrive (BarA) | Arrive (BarB) |
| Arrive (BarB) | Arrive (BarA) |
| Wait (BarA) | Wait (BarB) |
| Wait (BarB) | Wait (BarA) | different barriers and order per thread

| Thread 0 | Thread 1 | Thread 2 |
|---|---|---|
| Arrive (BarA) | Arrive (BarC) | Arrive (BarB) |
| Arrive (BarB) | Arrive (BarA) | Arrive (BarC) |
| Wait (BarA) | Wait (BarA) | Wait (BarB) |
| Wait (BarB) | Wait (BarC) | Wait (BarC) |

In some example non-limiting embodiments, the following overlaps should not be permitted as they would produce a deadlock.

→deadlock

| Thread 0 | Thread 1 |
|---|---|
| Arrive (BarA) | Arrive (BarB) |
| Wait (BarA) | Wait (BarB) |
| Arrive (BarB) | Arrive (BarA) |
| Wait (BarB) | Wait (BarA) |

State Example

Figure 6:
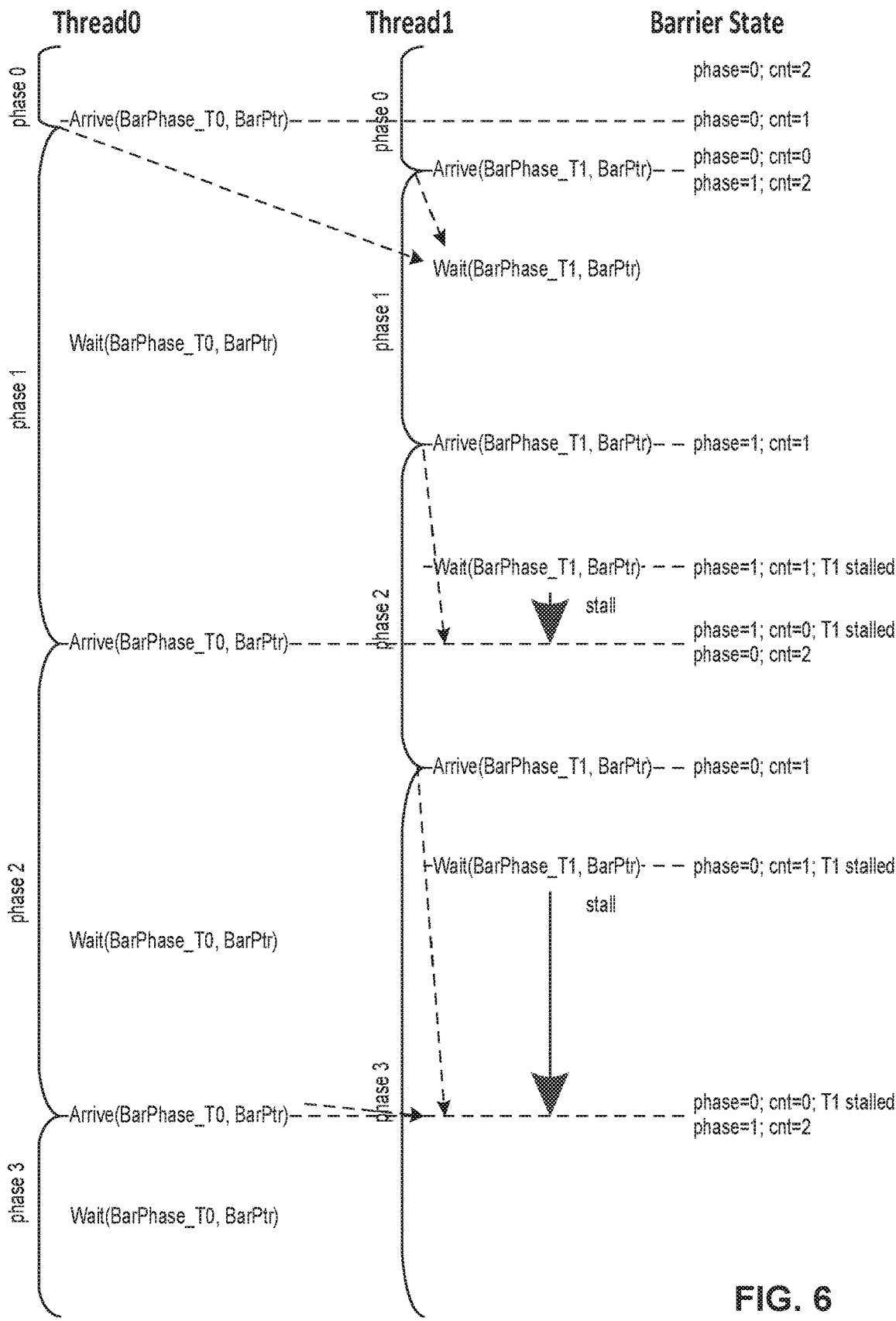
FIGS. 6 & 7 show illustrative two-thread barrier examples.

FIG. 6 shows an example state example. FIG. 6 shows first the change from phase 0 to phase 1 (when all arrives occur, the barrier phase changes and the count is rearmed). The Thread1 operation "Wait(BarPhase_T1, BarPtr)" will make sure all loads/stores for phase 0 for all participating threads are visible to thread1 before continuing. Similar Wait operations in Phase 1 and Phase 2 provide similar functions for those phases. Each time the barrier it used, it's a new phase, so the internal phase indicator only needs to be a single bit in example embodiments to indicate which phase a particular Wait( ) needs to wait for.

Figure 7:
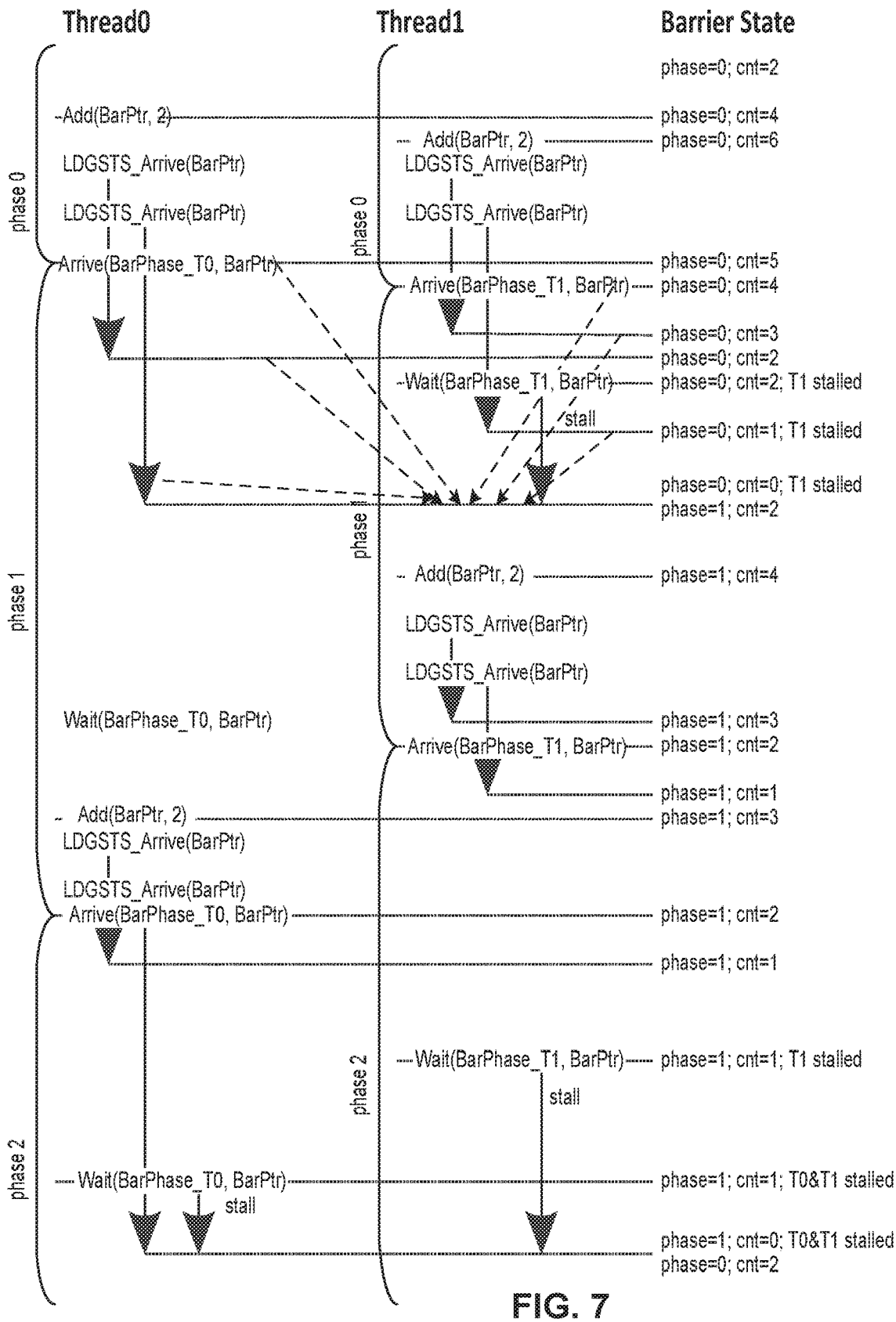

FIG. 7 shows an additional state example that includes load/store operations performed by hardware operators such as copy engine 210. The "Add(BarPtr, 2) commands performed by thread0 and thread1 are used to add these two copy engine operations to the barrier.

In this example, the operation "Wait(BarPhase_T1, BarPtr)" makes sure all loads/stores in phase0 for all participating threads are visible to thread1 (marked by Arrives) and all LDGSTS results are visible in shared memory (marked by LDGSTS Arrive). Once all arrives have occurred (see arrowed lines indicating phase=0 and then phase=1), the barrier phase changes and the count is rearmed.

Figure 8:
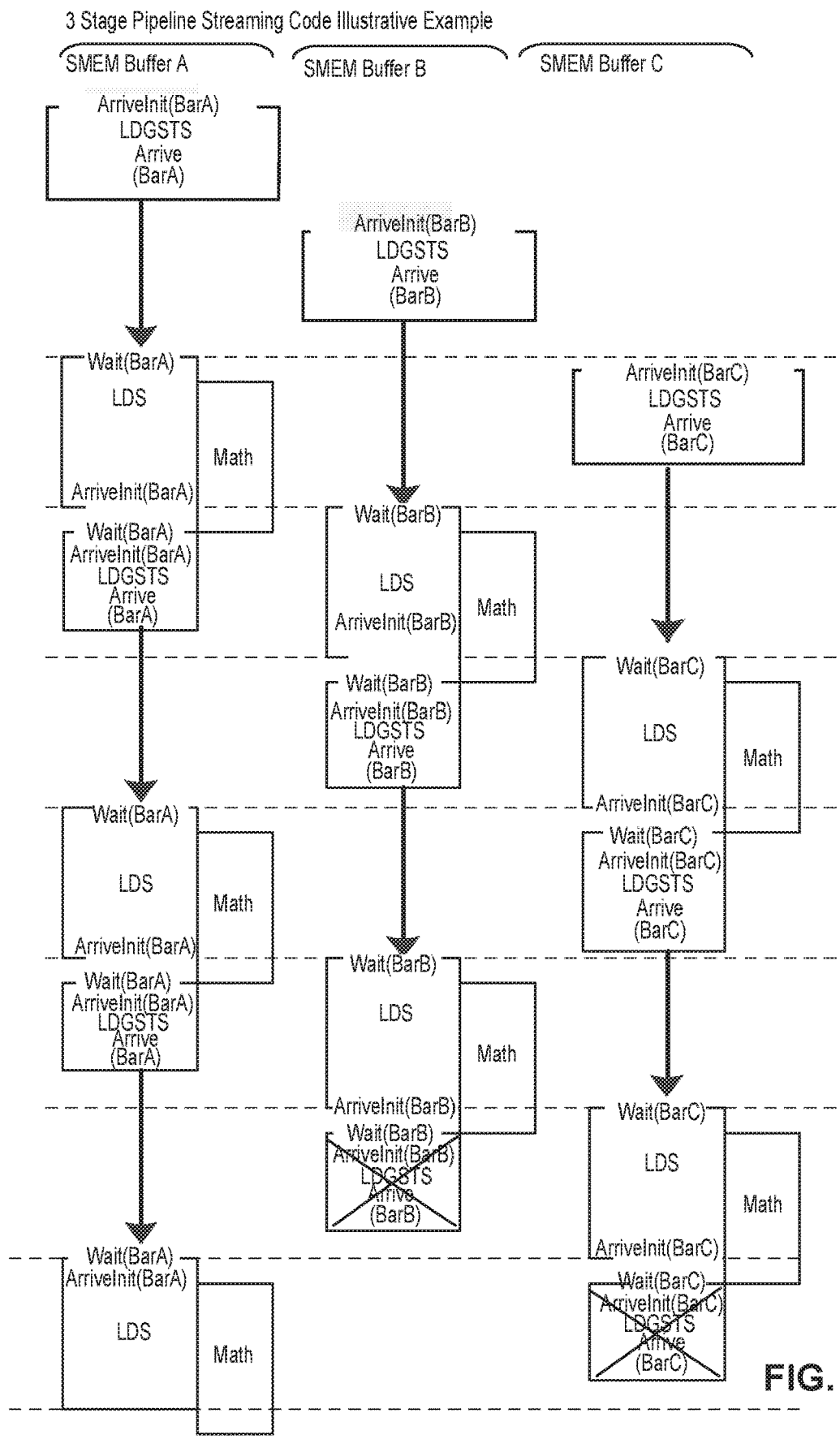
FIG. 8 shows a three-stage pipeline streaming code illustrative example.
Figure 9:
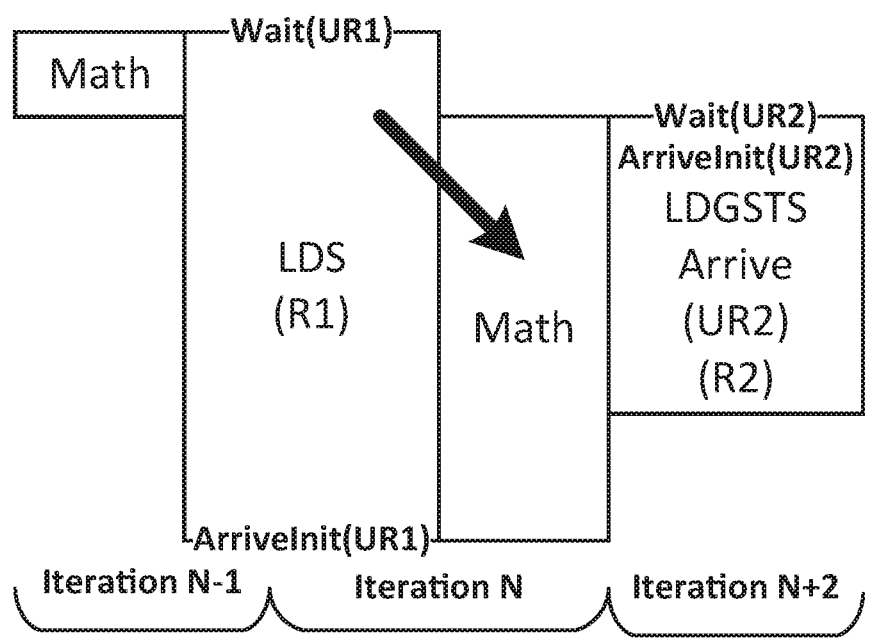
FIG. 9 shows an example non-limiting loop code structure.

FIG. 8 shows a three-stage pipeline streaming code illustrative example. The FIG. 8 shows the priming of the loop, then iterations of the loop. FIG. 9 shows a loop code structure example with the following details:

- - - URF/RF Values - - -

URF1/URF2: Points to barrier to use

RF1/RFT: Points to SMEM buffer to use

| iteration | UR1/R1 | UR2/R2 |
|---|---|---|
| 0 | BarA/SBufA | BarC/SBufC |
| 1 | BarB/SBufB | BarA/SBufB |
| 2 | BarC/SBufC | BarB/SBufB |

... repeat ...

All documents cited herein are incorporated by reference as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A synchronization barrier comprising:
    a data structure stored in memory, the data structure comprising a counter;
    the counter being advanced by a first operation performed by an execution thread and the counter being further advanced by a second operation performed by a hardware based controlled operator that can advance the counter independently of the first operation performed by the execution thread,
    wherein the data structure stored in the memory comprises an arrival counter and a further value used to reinitialize the arrival counter upon reset of the synchronization barrier, and the hardware operator comprises hardware that performs copying.

2. The synchronization barrier of claim 1 wherein the data structure stored in the memory comprises a phase flag.

3. The synchronization barrier of claim 1 wherein the first operation comprises an ARRIVE that is distinct from a WAIT and/or a WAIT that is distinct from an ARRIVE.

4. The synchronization barrier of claim 1 wherein the data structure is structured to be reset in response to a fused load/store atomic that can be initiated by either a hardware engine or a software thread.

5. The synchronization barrier of claim 1 further comprising circuitry associated with the counter that enables gating of further execution of the same or different execution thread based on a state of the counter.

6. A computing system comprising:
    a synchronization barrier primitive stored in memory, the primitive including a counter and a phase indicator, wherein the counter is associated with a collection of threads and at least one copy operation performed a hardware based controlled operator; and
    a memory access circuit that resets the counter and changes the phase indicator in response to the counter indicating that all threads in the collection of threads and the at least one copy operation have reached a synchronization point and all operations in said collection of threads have completed.

7. The system of claim 6 wherein the counter counts an aggregate of a number of copy operation completions and the number of execution thread arrive calls.

8. The system of claim 6 wherein the memory access circuit resets the counter and changes the phase indicator in response to executing of an instruction by a software thread, the instruction consisting of an ARRIVE operation that does not include a WAIT operation or a WAIT operation that does not include an ARRIVE operation.

9. The system of claim 6 wherein primitive stored in the memory further comprises a predetermined value, and hardware resets the counter by loading the predetermined value when the counter indicates that all threads in a collection of threads and copy operations have reached a synchronization point and all copy operations in said collection have completed.

10. The system of claim 9 wherein the system is structured to allow a thread to dynamically change the predetermined value.

11. The system of claim 6 wherein the synchronization barrier primitive is stored in shared memory of a Graphics Processing Unit (GPU).

12. The system of claim 6 wherein the synchronization barrier primitive is stored in a memory hierarchy which determines access by threads to the primitive.

13. The system of claim 6 further including a comparator that compares the count of the counter with a predetermined value and resets the primitive based on results of the comparison.

14. The system of claim 6 wherein the primitive's phase indicator is structured to be read first by an ARRIVE command and then by a WAIT command, so that a thread can determine whether the primitive's phase indicator has changed phase state.

15. A non-transitory readable medium storing a Graphics Processing Unit (GPU) instruction set architecture comprising:
    an ARRIVE operation that reads at least a phase indicator portion of a synchronization barrier primitive stored in memory and causes the barrier primitive to advance a counter by a first operation performed by an execution thread and to advance the counter by a second operation performed by a hardware based controlled operator;
    a WAIT operation that reads at least the phase indicator portion of the primitive stored in the memory and compares the phase indicator portion read by the ARRIVE operation with the phase indicator portion of the primitive read by the WAIT operation to determine whether a phase state of a barrier has changed, and
    a fused load/store instruction that permits a hardware-based engine to reset the synchronization barrier primitive when the hardware-based engine completes a task assigned to it.

16. The non-transitory readable medium of claim 15, wherein the GPU instruction set architecture further includes an ADD operation that adds to a field stored with the synchronization barrier primitive, the field being used to reinitialize the primitive upon reset to a next phase state.

17. The non-transitory readable medium of claim 15, wherein the GPU instruction set architecture further comprises a CREATE instruction that initializes and stores the synchronization barrier primitive to the memory.

18. A synchronization method comprising:
    storing in memory synchronization barrier indicia including a phase indicator and a counter associated with a set of threads and a task performed by a hardware initiated controller;
    executing an arrive instruction with at least one thread of the set of threads, thereby causing the counter to count and enabling the thread to read the phase indicator;
    completing the task with the hardware initiated controller, thereby causing the counter to count;

resetting the counter when the counter count indicates that the set of threads have executed arrive instructions and the hardware initiated controller has completed the task; and executing a wait instruction with the at least one thread, thereby enabling the at least one thread to again read the phase indicator, the at least one thread conditioning blocking on whether the phase indicator has changed values.

19. The synchronization method of claim 18 including opening a window of execution from when at least one thread executes the arrive instruction to when the at least one thread executes the wait instruction, the at least one thread performing work that is asynchronous with respect to a synchronization barrier within the window of execution.

20. A synchronization barrier comprising:
a counter providing a synchronization barrier count, wherein the counter resides in memory; and
circuitry operatively connected to the counter that advances the synchronization barrier count in response to completion of software initiated operations performed by execution threads and advances the synchronization barrier count in response to completion of operations performed by hardware initiated operators, wherein the circuitry is structured to reset the synchronization barrier count in response to a fused load/store atomic that can be initiated by each of copy hardware and software thread execution.

21. The synchronization barrier of claim 20 wherein the memory comprises memory shared by the execution threads and the hardware initiated operators.

22. The synchronization barrier of claim 20 wherein the counter is stored in shared memory of a Graphics Processing Unit (GPU).

* * * * *